(12) United States Patent
Sanjo

(10) Patent No.: US 10,261,293 B2
(45) Date of Patent: Apr. 16, 2019

(54) ZOOM LENS HAVING A HIGH ZOOM RATIO AND HIGH PERFORMANCE OVER AN ENTIRE ZOOM RANGE AND IMAGE PICKUP APPARATUS INCLUDING THE SAME

(71) Applicant: CANON KABUSHIKI KAISHA, Tokyo (JP)

(72) Inventor: Yotaro Sanjo, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 298 days.

(21) Appl. No.: 14/695,536

(22) Filed: Apr. 24, 2015

(65) Prior Publication Data

US 2015/0316756 A1    Nov. 5, 2015

(30) Foreign Application Priority Data

May 1, 2014   (JP) ................................ 2014-094611

(51) Int. Cl.
  *G02B 27/00*   (2006.01)
  *G02B 15/173*  (2006.01)
  *G02B 15/20*   (2006.01)

(52) U.S. Cl.
  CPC ........... *G02B 15/173* (2013.01); *G02B 15/20* (2013.01); *G02B 27/0025* (2013.01)

(58) Field of Classification Search
  CPC .......... G02C 11/10; G02C 7/12; G02C 7/101; G02C 7/00; G06F 3/013; G06F 3/011; G02B 27/0172; G02B 27/017; G02B 27/0093; G02B 2027/0178; G02B 2027/0141; G02B 2027/0187; G02B 2027/0138; G02B 2027/0127; G02B 5/30;
  (Continued)

(56) References Cited

U.S. PATENT DOCUMENTS

2009/0040625 A1* 2/2009 Shinohara ............ G02B 27/646
                                                                   359/687
2011/0255176 A1* 10/2011 Shinohara ............ G02B 15/173
                                                                   359/687
(Continued)

FOREIGN PATENT DOCUMENTS

JP      H07-325252 A    12/1995
JP      H10-161026 A    6/1998
(Continued)

OTHER PUBLICATIONS

Japanese office action issued in corresponding application No. 2014094611 dated Jan. 11, 2018, with translation, 9 pages.

*Primary Examiner* — William R Alexander
*Assistant Examiner* — Henry A Duong
(74) *Attorney, Agent, or Firm* — Carter, DeLuca & Farrell, LLP

(57) ABSTRACT

Provided is a zoom lens, including, in order from an object side to an image side: a first lens unit having a positive refractive power that does not move for zooming; a second lens unit having a negative refractive power that moves during zooming; at least one lens unit that moves during zooming; and a rear lens unit including an aperture stop, in which a focal length of the zoom lens at a wide angle end, a focal length of the first lens unit, a focal length of the second lens unit, and a half angle of field of the zoom lens at the wide angle end are appropriately set.

19 Claims, 13 Drawing Sheets

(58) Field of Classification Search
CPC .. G02B 15/173; G02B 27/0025; G02B 15/20; A61B 3/113
USPC ....... 359/689, 691, 687, 688, 690, 692, 793, 359/794, 795, 796
See application file for complete search history.

(56) References Cited

U.S. PATENT DOCUMENTS

2012/0057251 A1* 3/2012 Takato ................. G02B 23/243
359/749
2014/0118841 A1* 5/2014 Toyama ................. G02B 15/17
359/688

FOREIGN PATENT DOCUMENTS

| JP | H11-160620 A | 6/1999 |
| JP | 2011-81065 A | 4/2011 |
| JP | 2011-175185 A | 9/2011 |
| JP | 2012-150248 A | 8/2012 |

\* cited by examiner

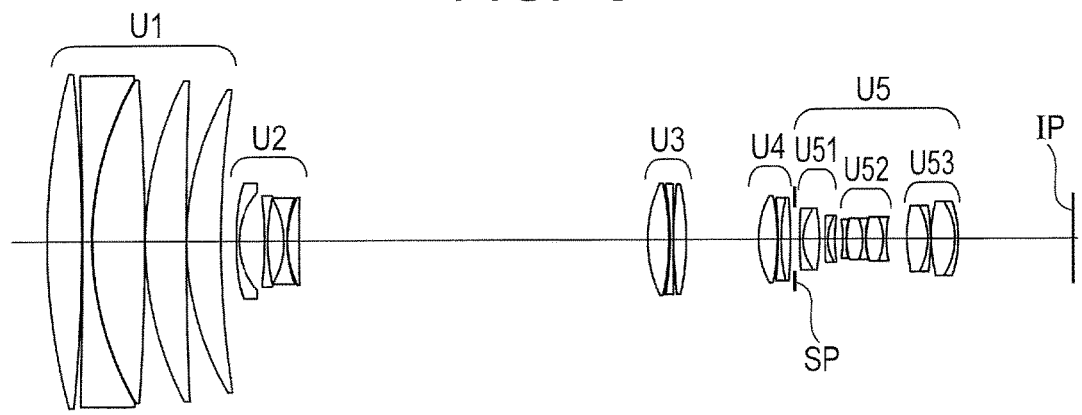
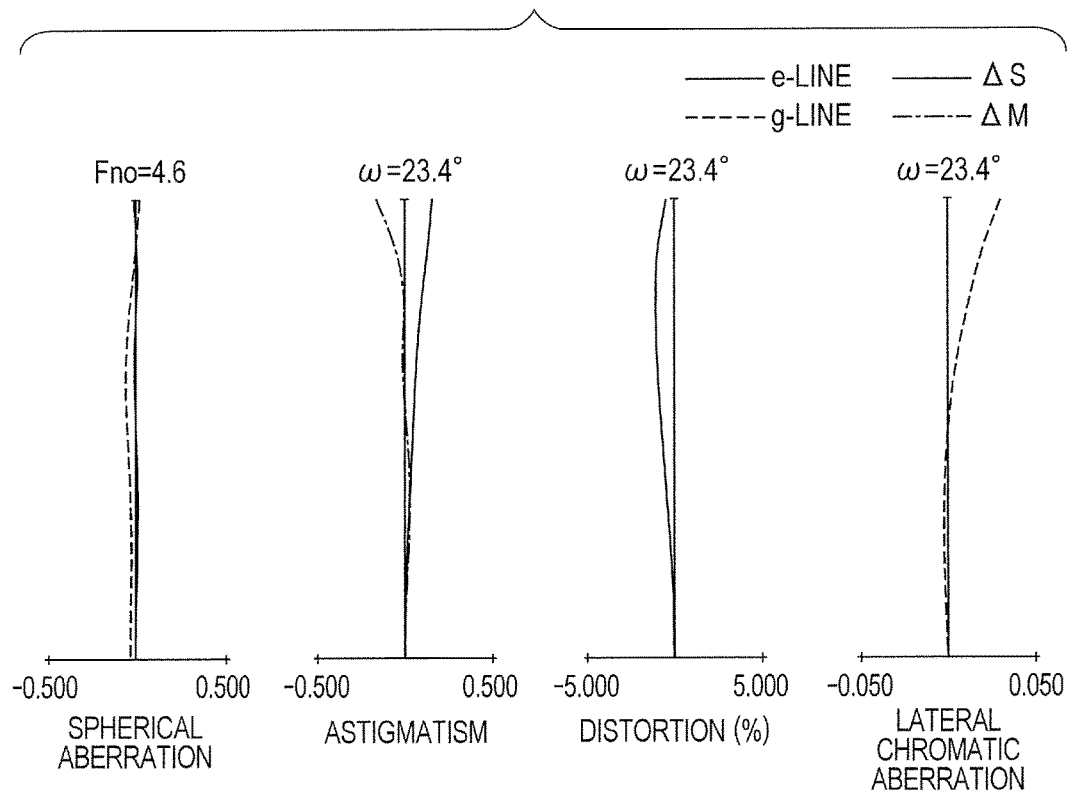

ZOOM LENS HAVING A HIGH ZOOM RATIO AND HIGH PERFORMANCE OVER AN ENTIRE ZOOM RANGE AND IMAGE PICKUP APPARATUS INCLUDING THE SAME

BACKGROUND OF THE INVENTION

Field of the Invention

The present invention relates to a zoom lens and an image pickup apparatus including the zoom lens, which are particularly suitable for use in a broadcasting television camera, a cinema camera, a video camera, a digital still camera, and a silver-halide film camera.

Description of the Related Art

In recent years, as an image pickup apparatus such as a television camera, a cinema camera, a video camera, or a film camera, a large format camera having features of a shallow depth of field and beautiful bokeh (blur) quality for expanding visual expression is used. As a zoom lens to be attached to the large format camera, a small and lightweight zoom lens having a high zoom ratio and high optical performance for securing mobility and improving flexibility in photography has been in demand. As the zoom lens having the high zoom ratio, as proposed in Japanese Patent Application Laid-Open Nos. 2011-175185 and 2012-150248, there has been known a positive-lead type zoom lens in which a lens unit having a positive refractive power is arranged closest to an object side and which includes four or more lens units in total.

In general, when an image size of the image pickup apparatus becomes large, the zoom lens to be attached thereto is accordingly increased in size. Therefore, in a case of being attached to the image pickup apparatus having the large image size, reductions in size and weight of the zoom lens become a problem.

The positive-lead type zoom lens described above is relatively easy to achieve the high zoom ratio. However, in order to realize an even higher zoom ratio, a moving amount of a second lens unit accompanying zooming is increased, which makes it difficult to achieve both the high zoom ratio and the reductions in size and weight. In order to realize the high zoom ratio and the reductions in size and weight with the above-mentioned positive-lead type zoom lens, it is particularly important to appropriately set refractive powers of a first lens unit and the second lens unit.

SUMMARY OF THE INVENTION

It is an object of the present invention to provide, as the above-mentioned positive-lead type zoom lens, a zoom lens which realizes a high zoom ratio and reductions in size and weight, and has high performance over an entire zoom range. More specifically, it is an object of the present invention to provide a zoom lens having an angle of field of about 46.8 to 56.8 degrees at a wide angle end, an angle of field of about 1.6 to 4.5 degrees at a telephoto end, and a magnification of about 11× to 30×.

According to one embodiment of the present invention, there is provided a zoom lens, including, in order from an object side to an image side: a first lens unit having a positive refractive power that does not move for zooming; a second lens unit having a negative refractive power that moves during zooming; at least one lens unit that moves during zooming; and a rear lens unit including an aperture stop, the zoom lens satisfying the following expressions:

$$-12.00 < f1/f2 < -4.00;\text{ and}$$

$$-1.00 < f2/(2 \times fW \times \tan(\omega\_W)) < -0.30,$$

where fW represents a focal length of the zoom lens at a wide angle end, f1 represents a focal length of the first lens unit, f2 represents a focal length of the second lens unit, and $\omega\_W$ represents a half angle of field of the zoom lens at the wide angle end.

According to the one embodiment of the present invention, as a zoom lens for a large format camera, in particular, there may be obtained the zoom lens which realizes the high zoom ratio and the reductions in size and weight, and has high optical performance over the entire zoom range from the wide angle end to the telephoto end, and an image pickup apparatus including the zoom lens.

Further features of the present invention will become apparent from the following description of exemplary embodiments with reference to the attached drawings.

BRIEF DESCRIPTION OF THE DRAWINGS

FIG. 3 is a lens cross-sectional view when focus is at infinity at a wide angle end in a zoom lens according to Embodiment 2 of the present invention.

FIG. 4A is a longitudinal aberration diagram when the focus is at infinity at the wide angle end in Embodiment 2.

DESCRIPTION OF THE EMBODIMENTS

Figure 1:
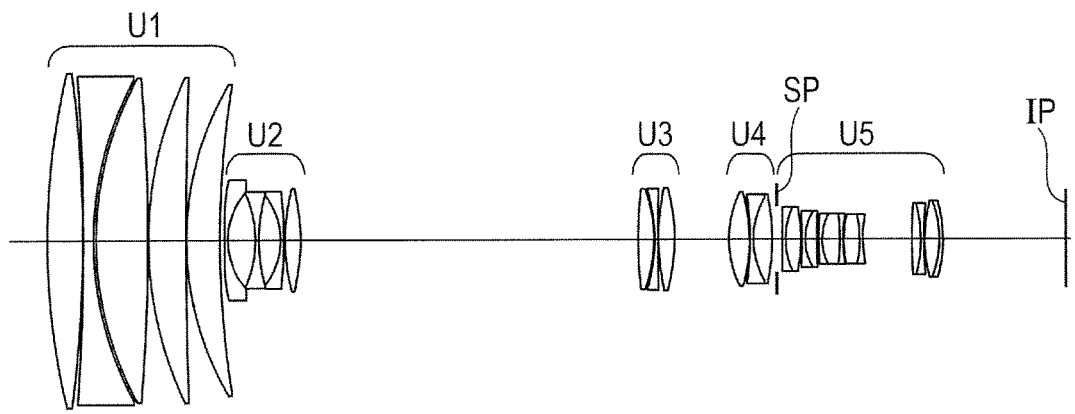
FIG. 1 is a lens cross-sectional view when focus is at infinity at a wide angle end in a zoom lens according to Embodiment 1 of the present invention.

Now, features of a zoom lens according to the present invention are described.

According to the present invention, there is provided a zoom lens, including, in order from an object side to an image side: a first lens unit having a positive refractive power that does not move for zooming; a second lens unit having a negative refractive power that moves during zooming; at least one lens unit that moves during zooming; and a rear lens unit including an aperture stop, the zoom lens satisfying the following expressions:

$$-12.00 < f1/f2 < -4.00 \tag{1}$$

$$-1.00 < f2/(2 \times fW \times \tan(\omega\_W)) < -0.30 \tag{2}$$

where fW represents a focal length of the zoom lens at a wide angle end, f1 represents a focal length of the first lens unit, f2 represents a focal length of the second lens unit, and ω_W represents a half angle of field at the wide angle end.

The conditional expression (1) defines a ratio of the focal length of the first lens unit U1 to the focal length of the second lens unit U2. The conditional expression (1) is satisfied to satisfactorily correct aberration variations of the zoom lens and realize both a high zoom ratio and reductions in size and weight. When the ratio exceeds the upper limit of the conditional expression (1), the focal length of the first lens unit is too short, which makes it difficult to correct a spherical aberration, an axial chromatic aberration, and the like especially at a telephoto end, and the focal length of the second lens unit is too long, which increases a moving amount of the second lens unit accompanying zooming and hence makes it difficult to realize both the high zoom ratio and the reductions in size and weight. When the ratio falls below the lower limit of the conditional expression (1), the focal length of the first lens unit is increased, which makes an effective diameter and a total lens length of the first lens unit large and makes it difficult to reduce the size and weight of the zoom lens, and the focal length of the second lens unit is too short, which makes it difficult to correct aberration variations in the spherical aberration, the axial chromatic aberration, and the like.

It is more preferred to set the conditional expression (1) as follows:

$$-8.00 < f1/f2 < -5.00 \tag{1a}$$

The conditional expression (2) defines a ratio of the focal length of the second lens unit U2 to an image size at the wide angle end. The conditional expression (2) is satisfied to satisfactorily correct the aberration variations of the zoom lens and realize both the high zoom ratio and the reductions in size and weight. When the ratio exceeds the upper limit of the conditional expression (2), the focal length of the second lens unit is too short, which makes it difficult to correct the aberration variations in the spherical aberration, the axial chromatic aberration, and the like. When the ratio falls below the lower limit of the conditional expression (2), the focal length of the second lens unit is too long, which increases the moving amount of the second lens unit accompanying the zooming and hence makes it difficult to realize both the high zoom ratio and the reductions in size and weight.

It is more preferred to set the conditional expression (1) as follows:

$$-0.99 < f2/(2 \times fW \times \tan(\omega\_W)) < -0.50 \tag{2a}$$

By satisfying the above-mentioned conditional expressions, despite being a zoom lens for a large format camera, the zoom lens according to the present invention realizes the high zoom ratio and the reductions in size and weight, and attains high optical performance over an entire zoom range from the wide angle end to the telephoto end.

The zoom lens according to the present invention has a further feature of satisfying a ratio of a lateral magnification β2W at the wide angle end of the second lens unit when focus is at infinity to a lateral magnification β2T at the telephoto end of the second lens unit, which is defined by the conditional expression (3):

$$9.00 < \beta2T/\beta2W < 35.00 \tag{3}$$

The conditional expression (3) is satisfied to satisfactorily correct the aberration variations of the zoom lens and allow the realization of both the high zoom ratio and the reductions in size and weight. When the ratio exceeds the upper limit of the conditional expression (3), a zoom magnification performed by the second lens unit becomes too large, which makes the refractive power of the second lens unit strong and makes it difficult to correct the spherical aberration, the axial chromatic aberration, and the like especially at the telephoto end. When the ratio falls below the lower limit of the conditional expression (3), the zoom magnification performed by the second lens unit becomes too small, which makes it difficult to achieve the high zoom ratio.

It is more preferred to set the conditional expression (3) as follows:

$$9.00 < \beta2T/\beta2W < 30.00 \tag{3a}$$

The zoom lens according to the present invention has a further feature of satisfying a ratio of a focal length at the telephoto end of the zoom lens to the focal length of the first lens unit, which is defined by the conditional expression (4):

$$2.00 < fT/f1 < 8.00 \tag{4}$$

The conditional expression (4) is satisfied to allow the realization of both the high zoom ratio and increase in performance. When the ratio exceeds the upper limit of the conditional expression (4), the focal length of the first lens unit becomes too short with respect to the focal length at the telephoto end of the zoom lens, which makes it difficult to suppress the various aberrations ascribable to the first lens unit, such as the spherical aberration and the axial chromatic aberration, especially at the telephoto end. When the ratio falls below the lower limit of the conditional expression (4), the focal length of the first lens unit becomes too long with respect to the focal length at the telephoto end of the zoom lens, which moves an object point position of a zoom lens unit away and hence increases a moving amount accompanying zooming to make the high zoom ratio difficult.

It is more preferred to set the conditional expression (4) as follows:

$$2.00<fT/f1<7.00 \quad (4a).$$

The zoom lens according to the present invention has a further feature of satisfying a ratio of the focal length f2 of the second lens unit to an air interval on an optical axis between the second lens unit and a third lens unit (interval on the optical axis between a surface on an image side of the second lens unit and a surface on an object side of the third lens unit) at the wide angle end L2W, which is defined by the conditional expression (5):

$$-0.50<f2/L2W<-0.05 \quad (5).$$

The conditional expression (5) is satisfied to satisfactorily correct the aberration variations of the zoom lens and allow the realization of both the high zoom ratio and the reductions in size and weight. When the ratio exceeds the upper limit of the conditional expression (5), the focal length of the second lens unit becomes too short with respect to the interval between the second lens unit and the third lens unit at the wide angle end, which makes it difficult to satisfactorily correct the aberration variations of the zoom lens. When the ratio falls below the lower limit of the conditional expression (5), the focal length of the second lens unit becomes too long with respect to the interval between the second lens unit and the third lens unit at the wide angle end, with the result that an enough moving amount of the second lens unit accompanying zooming cannot be secured, which makes it difficult to achieve the high zoom ratio.

It is more preferred to set the conditional expression (5) as follows:

$$-0.40<f2/L2W<-0.10 \quad (5a).$$

The zoom lens according to the present invention has a further feature of satisfying a ratio of a distance LF on the optical axis from a surface closest to the object side of the first lens unit to the aperture stop to the image size at the wide angle end, which is defined by the conditional expression (6):

$$4.00<LF/(fW\times\tan(2\times\omega\_W))<20.00 \quad (6).$$

The conditional expression (6) is satisfied to satisfactorily correct the aberration variations of the zoom lens and allow the realization of both the high zoom ratio and the reductions in size and weight. When the ratio exceeds the upper limit of the conditional expression (6), a total length of the zoom lens unit becomes too long with respect to the image size, which makes it difficult to achieve the reductions in size and weight. When the ratio falls below the lower limit of the conditional expression (6), the total length of the zoom lens unit becomes too short with respect to the image size, and the refractive power of especially the second lens unit needs to be made strong in order to secure the zoom magnification, which makes it difficult to satisfactorily correct the aberration variations of the zoom lens and achieve the high zoom ratio.

It is more preferred to set the conditional expression (6) as follows:

$$6.00<LF/(2\times fW\times\tan(\omega\_W))<15.00 \quad (6a).$$

The zoom lens according to the present invention has a further feature of satisfying a ratio of a focal length fT at the telephoto end of the zoom lens to the image size at the wide angle end, which is defined by the conditional expression (7):

$$10.00<fT/(2\times fW\times\tan(\omega\_W))<40.00 \quad (7).$$

The conditional expression (7) is satisfied to satisfactorily correct the aberration variations of the zoom lens and allow the realization of both an increased telephoto range and the reductions in size and weight. When the ratio exceeds the upper limit of the conditional expression (7), the focal length of the zoom lens at the telephoto end is too long with respect to the image size, which makes it difficult to correct the spherical aberration, the axial chromatic aberration, and the like especially at the telephoto end, and the effective diameter and the total lens length of the first lens unit are increased, which makes it difficult to realize the reductions in size and weight of the zoom lens. When the ratio falls below the lower limit of the conditional expression (7), the focal length of the zoom lens at the telephoto end is too short with respect to the image size, which is disadvantageous in increasing the telephoto range of the zoom lens.

It is more preferred to set the conditional expression (7) as follows:

$$10.00<fT/(2\times fW\times\tan(\omega\_W))<35.00 \quad (7a).$$

Through the satisfaction of the above-mentioned conditional expressions in the zoom lens according to the present invention, the aberration variations may be satisfactorily corrected and both the high zoom ratio and the reductions in size and weight may be realized.

Embodiment 1

FIG. 1 is a lens cross-sectional view when focus is at an object at infinity at a wide angle end in a zoom lens according to Embodiment 1. The zoom lens according to Embodiment 1 of the present invention includes, in order from the object side, a first lens unit having a positive refractive power that does not move for zooming, a second lens unit having a negative refractive power that moves during zooming, at least one lens unit that moves during zooming, and a rear lens unit including the aperture stop.

The first lens unit U1 is a lens unit having the positive refractive power that does not move for zooming. The second lens unit U2 is a variator lens unit having a negative refractive power for zooming that moves toward the image side during zooming from the wide angle end (short focal length end) to the telephoto end (long focal length end). The "at least one lens unit that moves during zooming" in this Embodiment includes, in order from the object side to the image side, a third lens unit U3 and a fourth lens unit U4. The third lens unit U3 is a variator lens unit having a positive refractive power for zooming that moves during zooming from the wide angle end (short focal length end) to the telephoto end (long focal length end). The fourth lens unit U4 is a compensator lens unit having a positive refractive power that moves in conjunction with the second lens unit U2 and the third lens unit U3 to correct an image plane variation accompanying zooming. Moreover, the fourth lens unit U4 that moves toward the object side during focus adjustment from the object at infinity to an object at close distance. In this Embodiment, the rear lens unit includes, in order from the object side to the image side, the aperture stop SP that does not move for zooming, and a fifth lens unit (relay lens unit) having a negative refractive power that does not move for zooming. An image plane IP corresponds to an imaging plane of a solid-state image pickup element (photoelectric transducer).

The lens units in Embodiment 1 have the following configurations in order from the object side to the image side. The first lens unit U1 includes a positive lens, a negative lens, and three positive lenses. The second lens unit U2 includes three negative lenses and a positive lens. The third lens unit U3 includes a positive lens, a negative lens, and a positive lens. The fourth lens unit U4 includes a positive lens and a cemented lens of a negative lens and a positive lens. The fifth lens unit U5 includes the aperture stop SP, two cemented lenses of a negative lens and a positive lens, a cemented lens of a negative lens, a positive lens, and a negative lens, and three cemented lenses of a positive lens and a negative lens.

Numerical Embodiment corresponding to Embodiment 1 is described in <Numerical Embodiment 1> below. In the Numerical Embodiments corresponding to the Embodiments described below, respectively, r represents a curvature radius of each surface counted from the object side, d represents an interval between surfaces, and nd and νd represent a refractive index and an Abbe number of each optical member. In this case, when an X axis corresponds to the optical axis, an H axis corresponds to an axis perpendicular to the optical axis, a traveling direction of light corresponds to a positive direction, a paraxial curvature radius is represented by R, a conic constant is represented by k, and aspherical coefficients are represented by A3, A4, A5, A6, A7, A8, A9, A10, A11, and A12, an aspherical surface shape is expressed by the following expression.

$$X = \frac{H^2/R}{1 + \sqrt{1-(1+k)(H/R)^2}} + A4H^4 + A6H^6 + A8H^8 +$$
$$A10H^{10} + A12H^{12} + A3H^3 + A5H^5 + A7H^7 + A9H^9 + A11H^{11}$$

where e-Z means ×10$^{-Z}$. The mark * represents the aspherical surface.

Figure 2A:
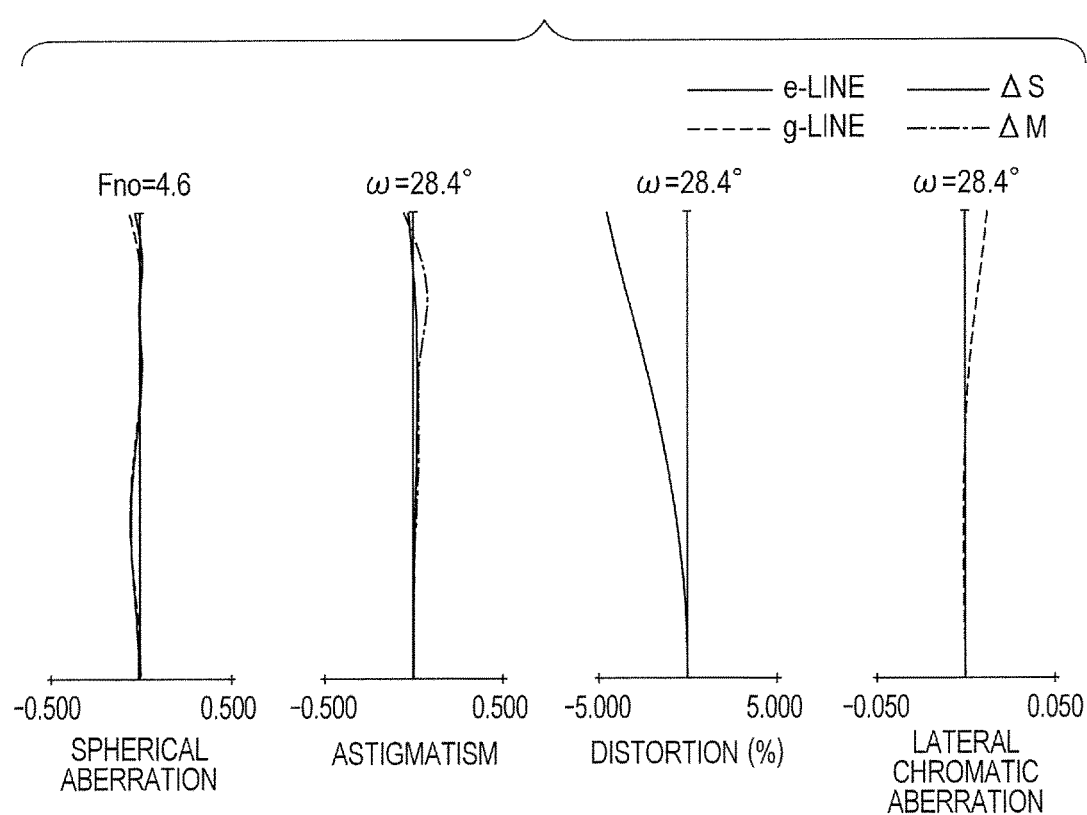
FIG. 2A is a longitudinal aberration diagram when the focus is at infinity at the wide angle end in Embodiment 1.
Figure 2B:
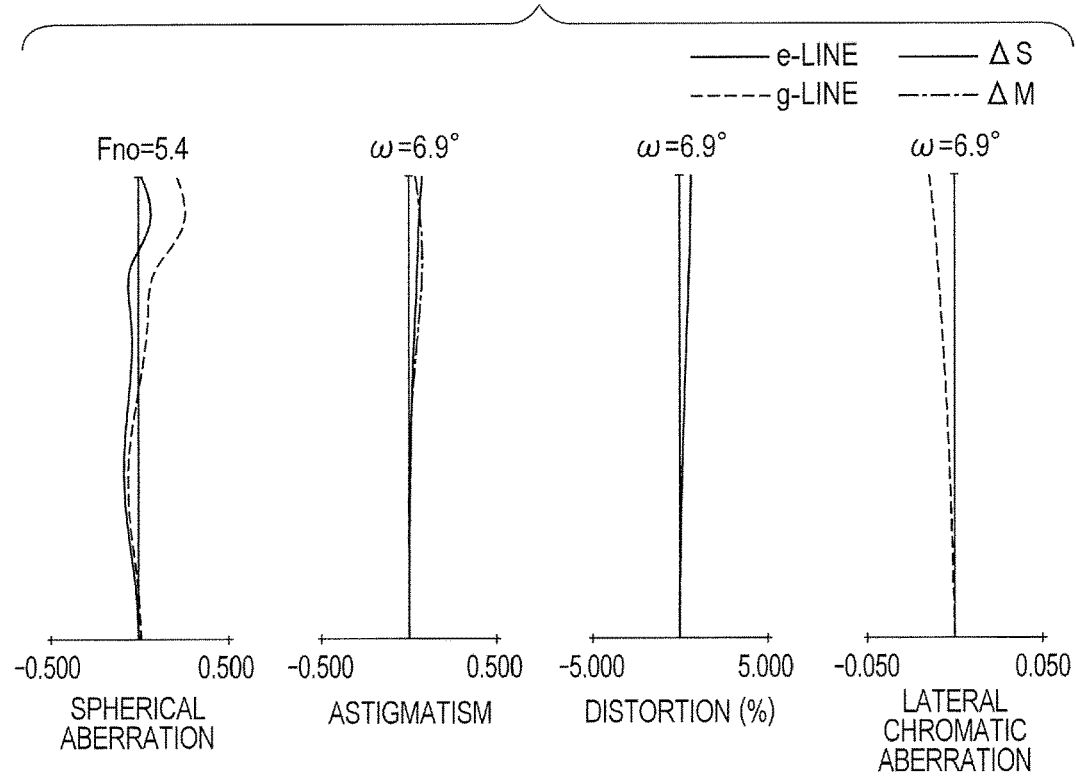
FIG. 2B is a longitudinal aberration diagram when the focus is at infinity at a focal length of 180.00 mm in Embodiment 1.
Figure 2C:
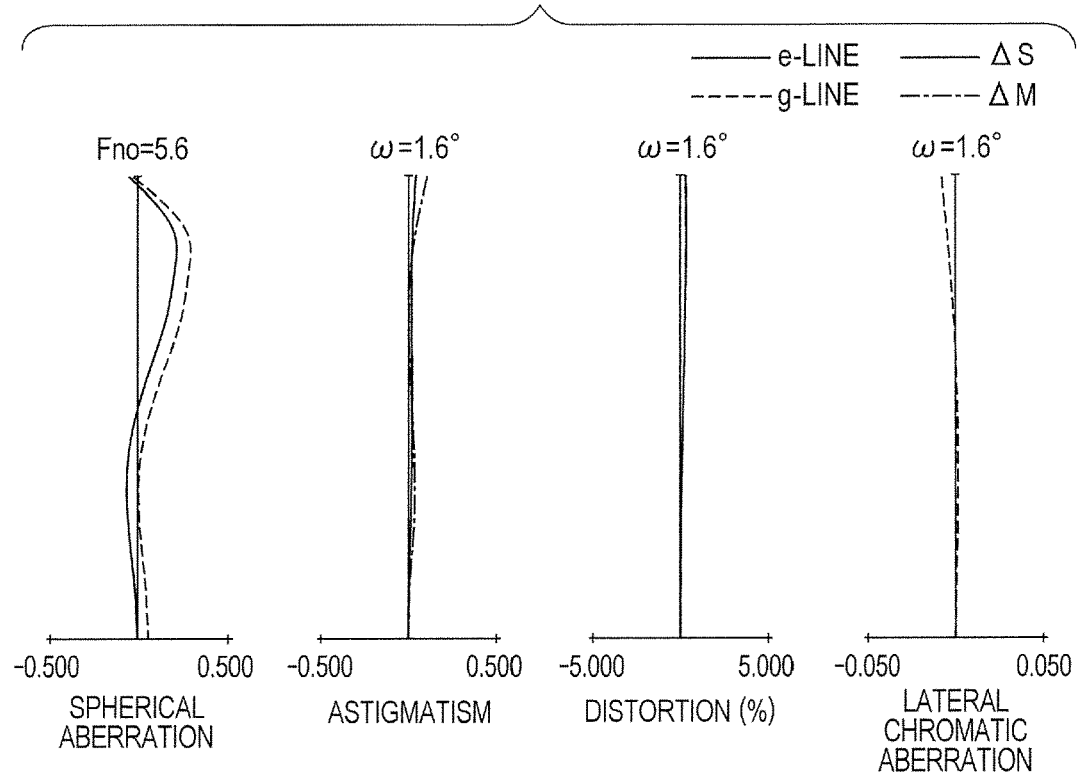
FIG. 2C is a longitudinal aberration diagram when the focus is at infinity at a telephoto end in Embodiment 1.

FIGS. 2A, 2B, and 2C are longitudinal aberration diagrams when the focus is at infinity at the wide angle end, a focal length of 180.00 mm, and the telephoto end, respectively, in the zoom lens according to Embodiment 1. In the figures, the value of the focal length is a value obtained when expressing Numerical Embodiment in units of mm, and the same applies to Numerical Embodiments below. In aberration diagrams, the spherical aberration is illustrated with respect to an e-Line and a g-Line. An astigmatism is illustrated on a meridional image plane (ΔM) with respect to the e-Line and on a sagittal image plane (ΔS) with respect to the e-Line. A lateral chromatic aberration is expressed by the g-Line. In all of the aberration diagrams, the spherical aberration, the astigmatism, the distortion, and the lateral chromatic aberration are drawn on scales of 0.5 mm, 0.5 mm, 5%, and 0.05 mm, respectively. Symbol Fno represents an F-number, and symbol ω represents a half angle of field. Note that, the wide angle end and the telephoto end refer to zoom positions when the second lens unit U2 for zooming is located at both ends of a range in which the second lens unit U2 is mechanically movable on the optical axis.

Table 1 shows corresponding values of the conditional expressions of Numerical Embodiment 1. Numerical Embodiment 1 satisfies all of the conditional expressions (1) to (7). The zoom lens in this Embodiment is small and lightweight despite being the zoom lens for the large format camera, and attains the high zoom ratio with a zoom ratio of 20.0×, a half angle of field at the wide angle end of 28.4 degrees, and a half angle of field at the telephoto end of 1.6 degrees, and the high optical performance over the entire zoom range from the wide angle end to the telephoto end.

Embodiment 2

FIG. 3 is a lens cross-sectional view when the focus is at the object at infinity at the wide angle end in the zoom lens according to Embodiment 2 of the present invention. The zoom lens according to Embodiment 2 of the present invention includes, in order from the object side, a first lens unit having a positive refractive power what does not move for zooming, a second lens unit having a negative refractive power that moves during zooming, at least one lens unit that moves during zooming, and a rear lens unit including an aperture stop.

The first lens unit U1 is a lens unit having the positive refractive power that does not move for zooming. The second lens unit U2 is a variator lens unit having a negative refractive power for zooming that moves toward the image side during zooming from the wide angle end (short focal length end) to the telephoto end (long focal length end). The "at least one lens unit that moves during zooming" in this Embodiment includes, in order from the object side to the image side, a third lens unit U3 and a fourth lens unit U4. The third lens unit U3 is a variator lens unit having a positive refractive power for zooming that moves during zooming from the wide angle end (short focal length end) to the telephoto end (long focal length end). The fourth lens unit U4 is a compensator lens unit having a positive refractive power that moves in conjunction with the second lens unit U2 and the third lens unit U3 to correct the image plane variation accompanying zooming. Moreover, the fourth lens unit U4 that moves toward the object side during focusing from the object at infinity to an object at close distance. In this Embodiment, the rear lens unit is represented by U5 in the figures and includes, in order from the object side to the image side, the aperture stop SP that does not move for zooming, a first sub lens unit U51 having a negative refractive power, a third sub lens unit U53 having a positive refractive power, and a second sub lens unit U52 having a negative refractive power, which moves toward the image side during zooming.

In Embodiment 2, all the lens configurations of the first to fourth lens units are the same as those in Numerical Embodiment 1. The fifth lens unit U5 includes the aperture stop SP, the first sub lens unit U51 including two cemented lenses of a negative lens and a positive lens, the second sub lens unit U52 including a negative lens, and two cemented lenses of a positive lens and a negative lens, and the third sub lens unit U53 including two cemented lenses of a positive lens and a negative lens.

Numerical Embodiment corresponding to Embodiment 2 is described in <Numerical Embodiment 2> below.

Figure 4B:
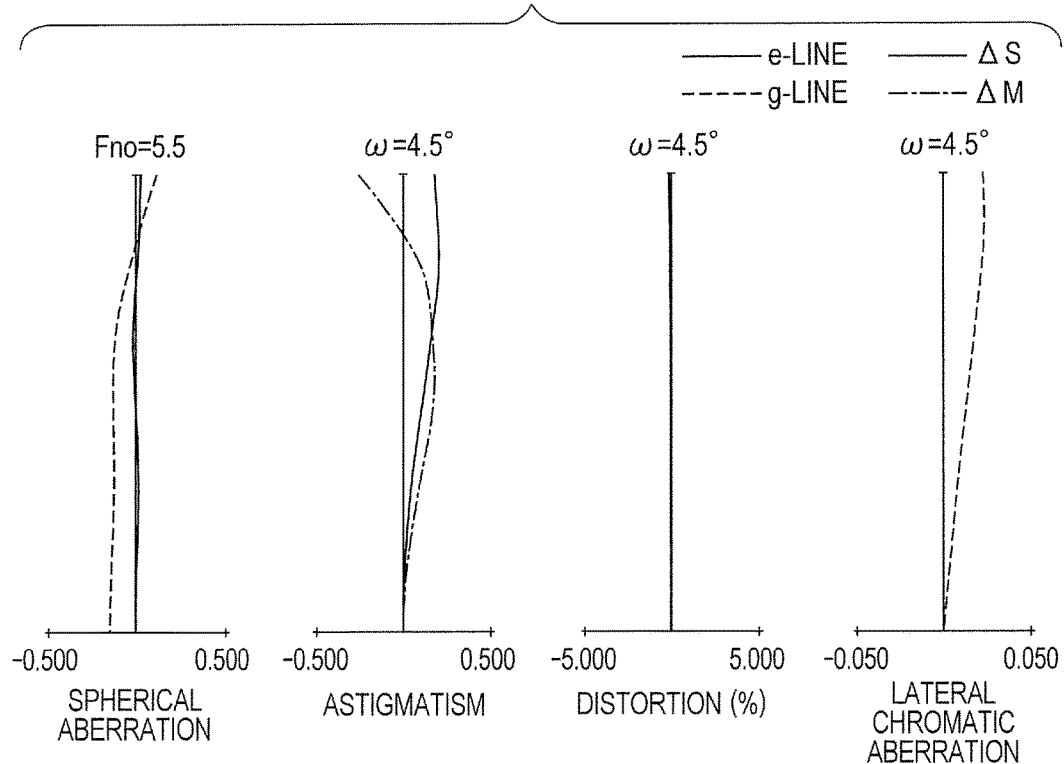
FIG. 4B is a longitudinal aberration diagram when the focus is at infinity at a focal length of 274.00 mm in Embodiment 2.
Figure 4C:
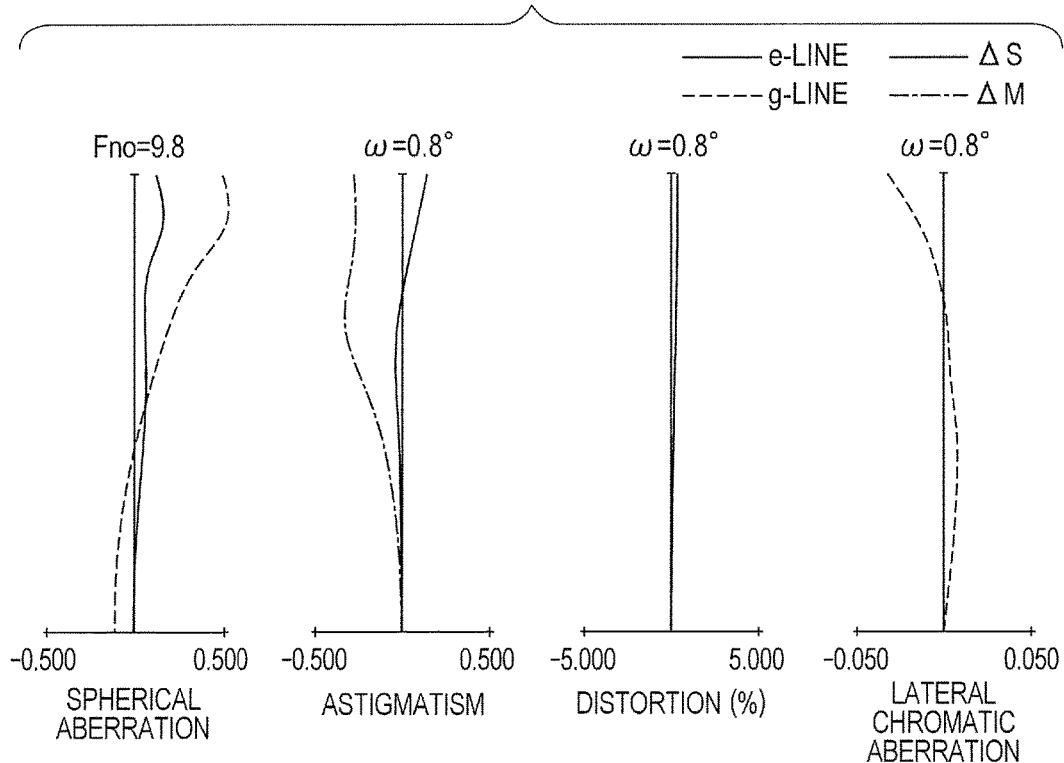
FIG. 4C is a longitudinal aberration diagram when the focus is at infinity at a telephoto end in Embodiment 2.

FIGS. 4A, 4B, and 4C are longitudinal aberration diagrams when the focus is at infinity at the wide angle end, a focal length of 274.00 mm, and the telephoto end, respectively, in the zoom lens according to Embodiment 2. In the figures, the value of the focal length is a value obtained when expressing Numerical Embodiment in units of mm, and the same applies to Numerical Embodiments below. In aberration diagrams, the spherical aberration is illustrated with respect to the e-Line and the g-Line. The astigmatism is illustrated on the meridional image plane (ΔM) with respect to the e-Line and on the sagittal image plane (ΔS) with respect to the e-Line. The lateral chromatic aberration is expressed by the g-Line. In all of the aberration diagrams, the spherical aberration, the astigmatism, a the distortion, and the lateral chromatic aberration are drawn on scales of 0.5 mm, 0.5 mm, 5%, and 0.05 mm, respectively. Symbol Fno represents the F-number, and symbol ω represents the half angle of field. Note that, the wide angle end and the telephoto end refer to the zoom positions when the second lens unit U2 for zooming is located at both ends of the range in which the second lens unit U2 is mechanically movable on the optical axis.

Table 1 shows corresponding values of the conditional expressions of Numerical Embodiment 2. Numerical Embodiment 2 satisfies all of the conditional expressions (1) to (7). The zoom lens in this Embodiment is small and lightweight despite being the zoom lens for the large format camera, and attains the high zoom ratio with a zoom ratio of 30.0×, a half angle of field at the wide angle end of 23.4 degrees, and a half angle of field at the telephoto end of 0.8 degree, and the high optical performance over the entire zoom range from the wide angle end to the telephoto end.

Embodiment 3

Figure 5:
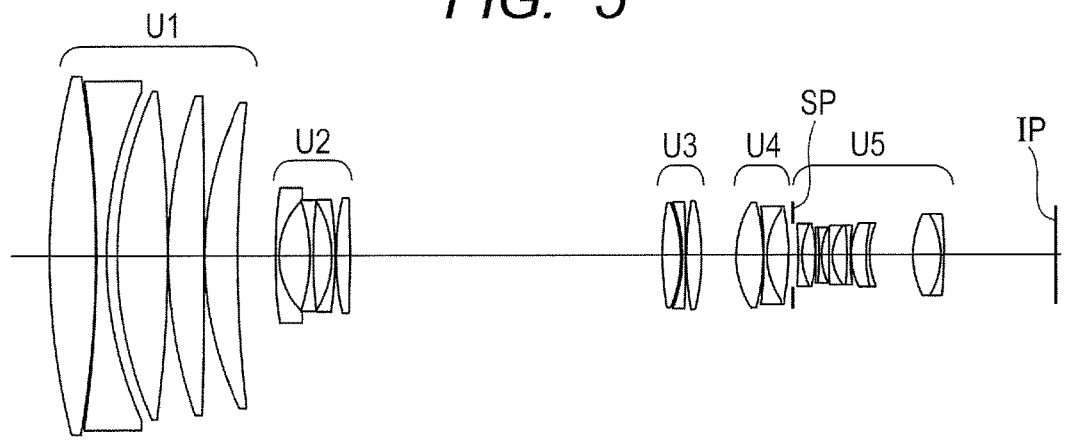
FIG. 5 is a lens cross-sectional view when focus is at infinity at a wide angle end in a zoom lens according to Embodiment 3 of the present invention.

FIG. 5 is a lens cross-sectional view when focus is at the object at infinity at the wide angle end in the zoom lens according to Embodiment 3 of the present invention. The zoom lens according to Embodiment 3 of the present invention includes, in order from the object side, a first lens unit having a positive refractive power that does not move for zooming, a second lens unit having a negative refractive power that moves during zooming, at least one lens unit that moves during zooming, and a rear lens unit including an aperture stop.

The first lens unit U1 is a lens unit having a positive refractive power that does not move for zooming. The second lens unit U2 is a variator lens unit having a negative refractive power for zooming that moves toward the image side during zooming from the wide angle end (short focal length end) to the telephoto end (long focal length end). The "at least one lens unit that moves during zooming" in this Embodiment includes, in order from the object side to the image side, a third lens unit U3 and a fourth lens unit U4. The third lens unit U3 is a variator lens unit having a positive refractive power for zooming that moves during zooming from the wide angle end (short focal length end) to the telephoto end (long focal length end). The fourth lens unit U4 is a compensator lens unit having a positive refractive power that moves in conjunction with the second lens unit U2 and the third lens unit U3 to correct the image plane variation accompanying zooming. Moreover, the fourth lens unit U4 that moves toward the object side during focus adjustment from the object at infinity to the object at close distance. In this Embodiment, the rear lens unit includes, in order from the object side to the image side, the aperture stop SP that does not move for zooming, and a fifth lens unit (relay lens unit) having a negative refractive power that does not move for zooming. The image plane IP corresponds to the imaging plane of the solid-state image pickup element (photoelectric transducer).

The lens units in Embodiment 3 have the following configurations in order from the object side to the image side. The first lens unit U1 includes a positive lens, a negative lens, and three positive lenses. The second lens unit U2 includes three negative lenses and a positive lens. The third lens unit U3 includes a positive lens, a negative lens, and a positive lens. The fourth lens unit U4 includes a positive lens and a cemented lens of a negative lens and a positive lens. The fifth lens unit U5 includes the aperture stop SP, a cemented lens of a negative lens and a positive lens, a cemented lens of a positive lens and a negative lens, a cemented lens of a negative lens, a positive lens, and a negative lens, and two cemented lenses of a positive lens and a negative lens.

Numerical Embodiment corresponding to Embodiment 3 is described in <Numerical Embodiment 3> below.

Figure 6A:
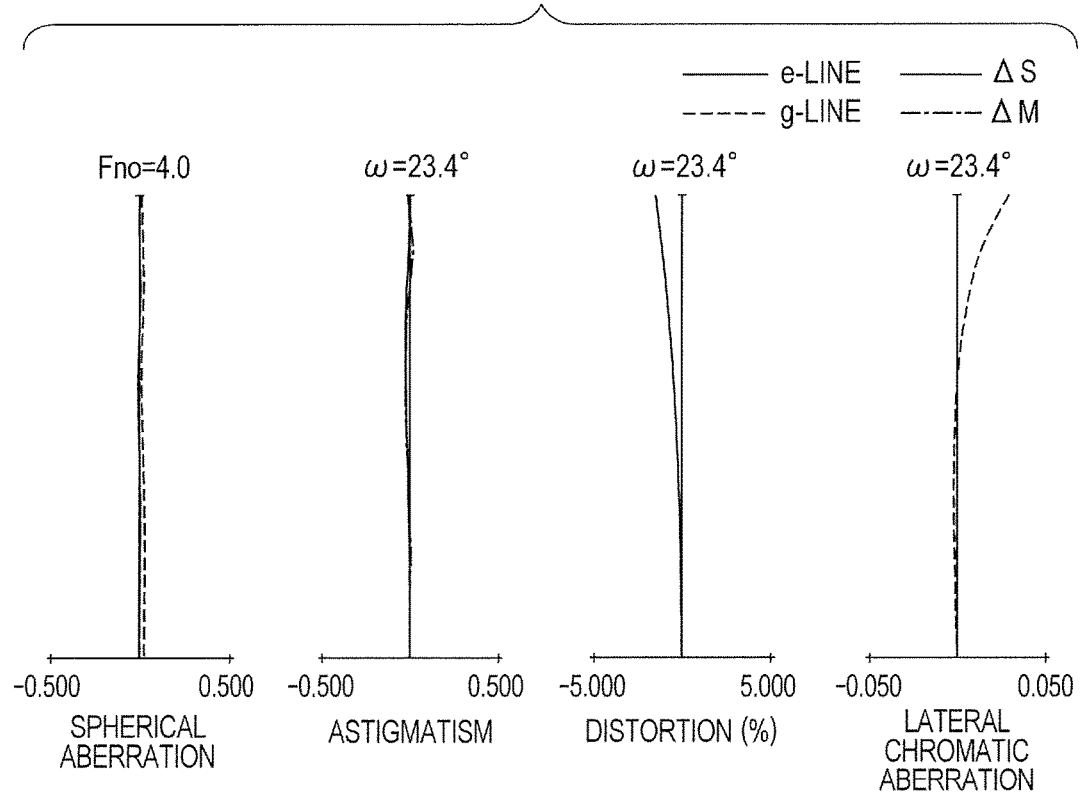
FIG. 6A is a longitudinal aberration diagram when the focus is at infinity at the wide angle end in Embodiment 3.
Figure 6B:
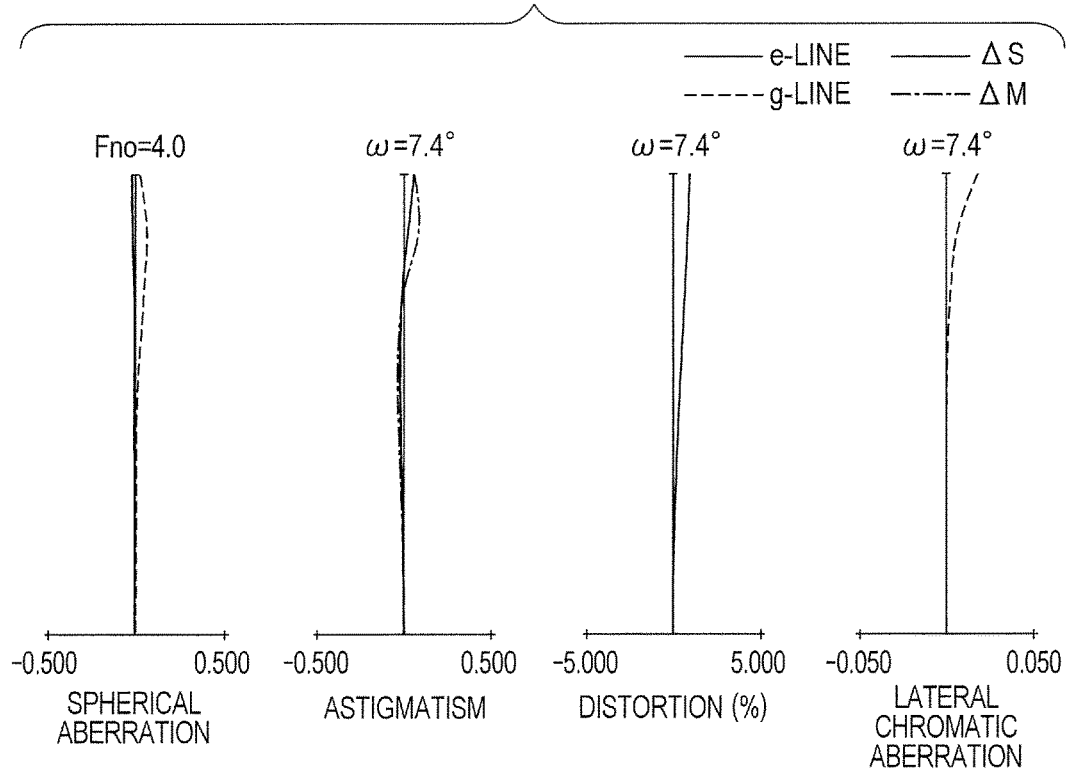
FIG. 6B is a longitudinal aberration diagram when the focus is at infinity at a focal length of 166.00 mm in Embodiment 3.
Figure 6C:
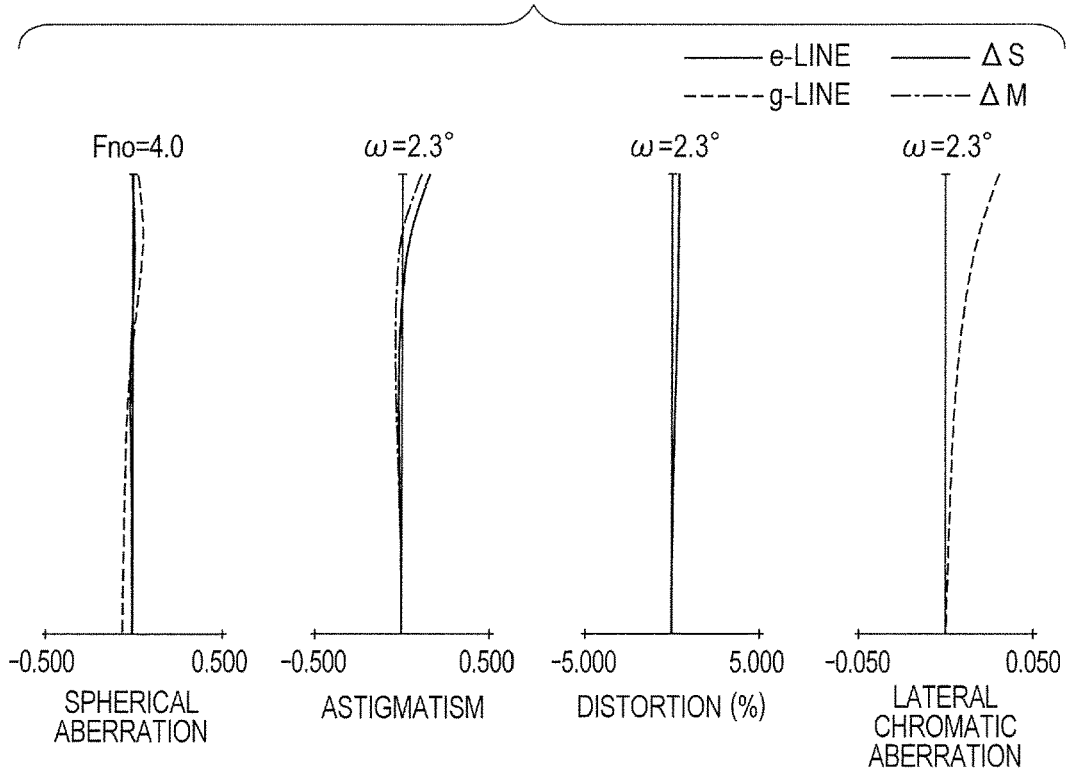
FIG. 6C is a longitudinal aberration diagram when the focus is at infinity at a telephoto end in Embodiment 3.

FIGS. 6A, 6B, and 6C are longitudinal aberration diagrams when the focus is at infinity at the wide angle end, a focal length of 166.00 mm, and the telephoto end, respectively, in the zoom lens according to Embodiment 3. In the figures, the value of the focal length is a value obtained when expressing Numerical Embodiment in units of mm, and the same applies to Numerical Embodiments below. In aberration diagrams, the spherical aberration is illustrated with respect to the e-Line and the g-Line. The astigmatism is illustrated on the meridional image plane (ΔM) with respect to the e-Line and on the sagittal image plane (ΔS) with respect to the e-Line. The lateral chromatic aberration is expressed by the g-Line. In all of the aberration diagrams, the spherical aberration, the astigmatism, the distortion, and the lateral chromatic aberration are drawn on scales of 0.5 mm, 0.5 mm, 5%, and 0.05 mm, respectively. Symbol Fno represents the F-number, and symbol ω represents the half angle of field. Note that, the wide angle end and the telephoto end refer to the zoom positions when the second lens unit U2 for zooming is located at both ends of the range in which the second lens unit U2 is mechanically movable on the optical axis.

Table 1 shows corresponding values of the conditional expressions of Numerical Embodiment 3. Numerical Embodiment 3 satisfies all of the conditional expressions (1) to (7). The zoom lens in this Embodiment is small and lightweight despite being the zoom lens for the large format camera, and attains the high zoom ratio with a zoom ratio of 11.0×, a half angle of field at the wide angle end of 23.4 degrees, and a half angle of field at the telephoto end of 2.3 degrees, and the high optical performance over the entire zoom range from the wide angle end to the telephoto end.

Embodiment 4

Figure 7:
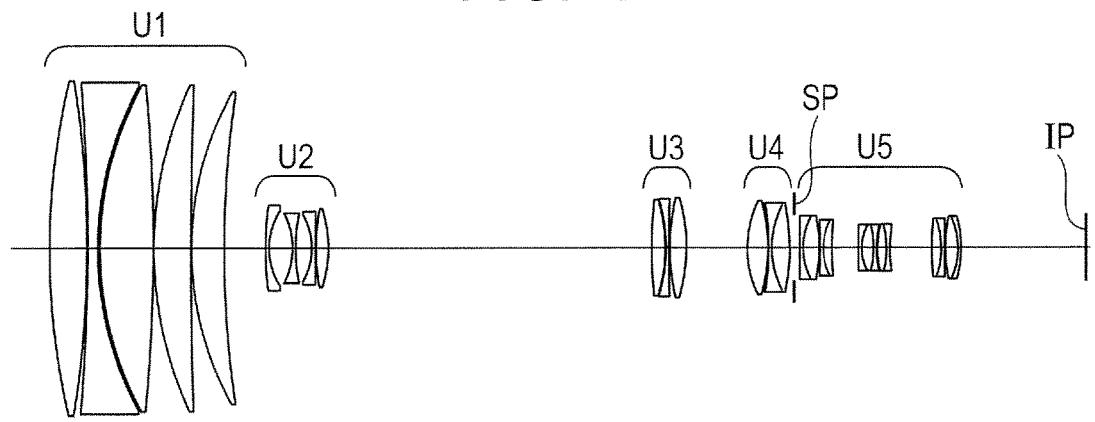
FIG. 7 is a lens cross-sectional view when focus is at infinity at a wide angle end in a zoom lens according to Embodiment 4 of the present invention.

FIG. 7 is a lens cross-sectional view when the focus is at the object at infinity at the wide angle end in the zoom lens according to Embodiment 4 of the present invention. The zoom lens according to Embodiment 4 of the present invention includes, in order from the object side, a first lens unit having a positive refractive power that does not move for zooming, a second lens unit having a negative refractive power that moves during zooming, at least one lens unit that moves during zooming, and a rear lens unit including an aperture stop.

The first lens unit U1 is a lens unit having a positive refractive power that does not move for zooming. The second lens unit U2 is a variator lens unit having a negative refractive power for zooming that moves toward the image side during zooming from the wide angle end (short focal length end) to the telephoto end (long focal length end). The "at least one lens unit that moves during zooming" in this Embodiment includes, in order from the object side to the image side, a third lens unit U3 and a fourth lens unit U4. The third lens unit U3 is a variator lens unit having a positive refractive power for zooming that moves during zooming from the wide angle end (short focal length end) to the telephoto end (long focal length end). The fourth lens unit U4 is a compensator lens unit having a positive refractive power that moves in conjunction with the second lens unit U2 and the third lens unit U3 to correct the image plane variation accompanying zooming. Moreover, the fourth lens unit U4 that moves toward the object side during focus adjustment from the object at infinity to the object at close distance. In this Embodiment, the rear lens unit includes, in order from the object side to the image side, the aperture stop SP that does not move for zooming, and a fifth lens unit (relay lens unit) having a negative refractive power that does not move for zooming. The image plane IP corresponds to the imaging plane of the solid-state image pickup element (photoelectric transducer).

The lens units in Embodiment 4 have the following configurations in order from the object side to the image side.

The first lens unit U1 includes a positive lens, a negative lens, and three positive lenses. The second lens unit U2 includes three negative lenses and a positive lens. The third lens unit U3 includes a positive lens, a negative lens, and a positive lens. The fourth lens unit U4 includes a positive lens and a cemented lens of a negative lens and a positive lens. The fifth lens unit U5 includes the aperture stop SP, two cemented lenses of a negative lens and a positive lens, a cemented lens of a negative lens, a positive lens, and a negative lens, and three cemented lenses of a positive lens and a negative lens. The lens configurations are the same as those in Embodiment 1.

Numerical Embodiment corresponding to Embodiment 4 is described in <Numerical Embodiment 4> below.

Figure 8A:
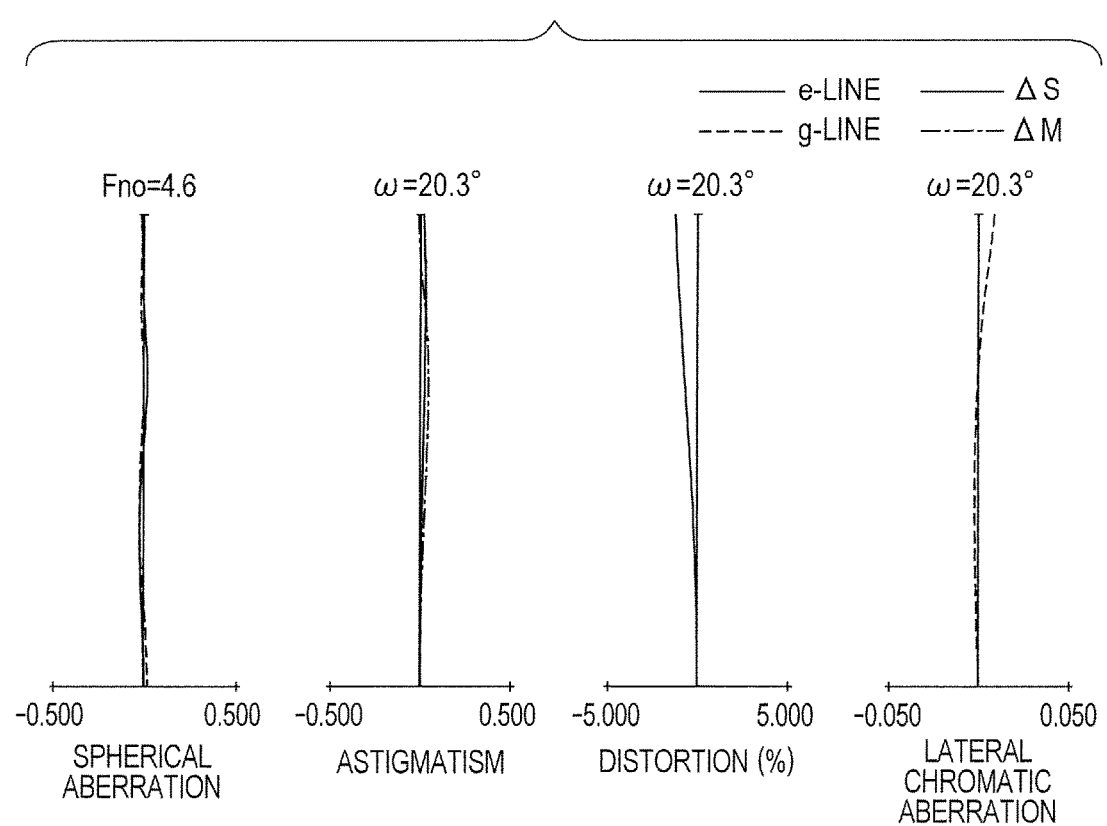
FIG. 8A is a longitudinal aberration diagram when the focus is at infinity at the wide angle end in Embodiment 4.
Figure 8B:
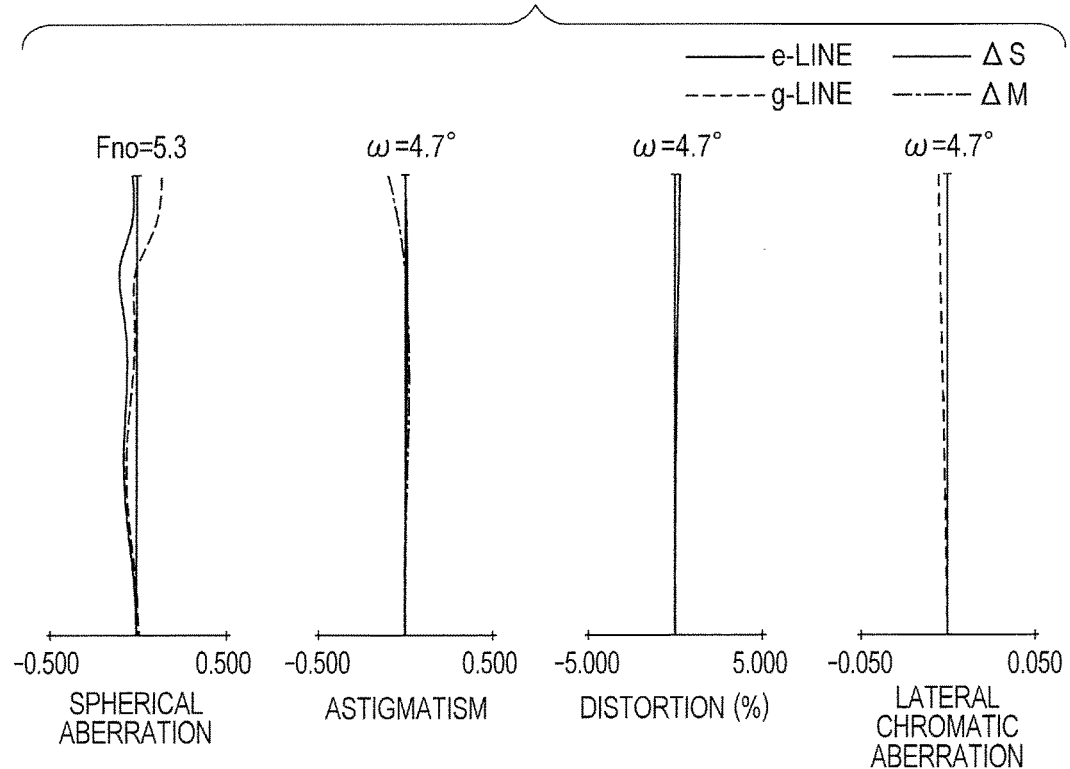
FIG. 8B is a longitudinal aberration diagram when the focus is at infinity at a focal length of 180.00 mm in Embodiment 4.
Figure 8C:
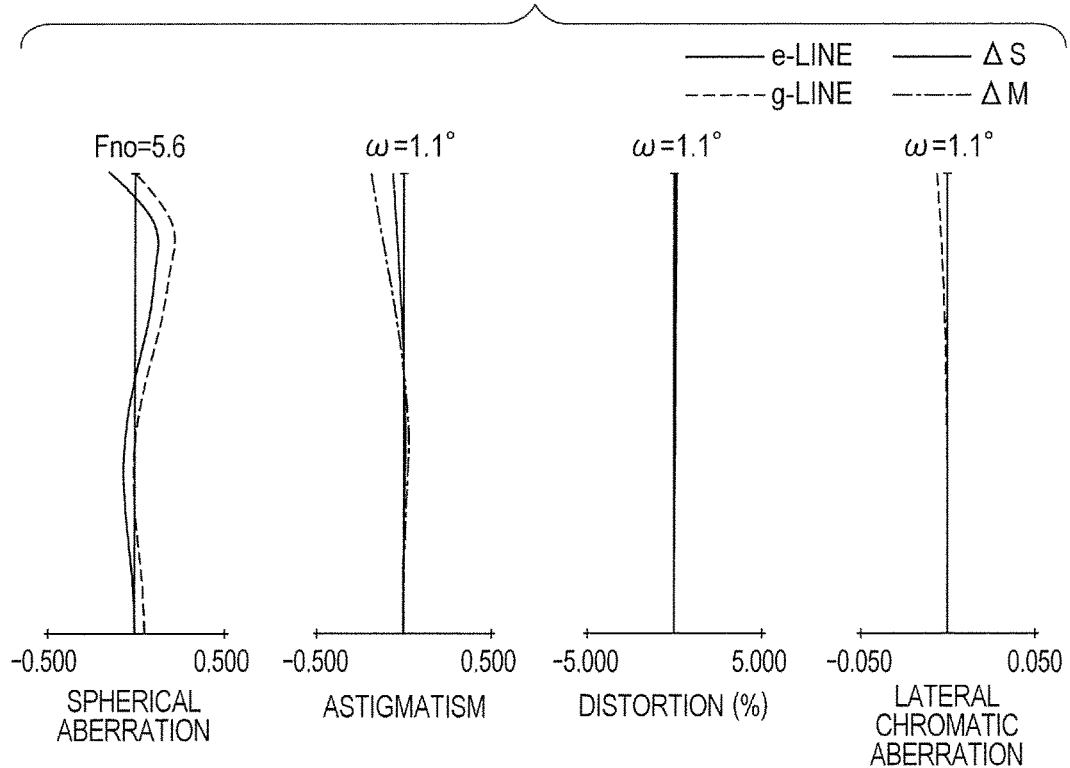
FIG. 8C is a longitudinal aberration diagram when the focus is at infinity at a telephoto end in Embodiment 4.

FIGS. 8A, 8B, and 8C are longitudinal aberration diagrams when the focus is at infinity at the wide angle end, a focal length of 180.00 mm, and the telephoto end, respectively, in the zoom lens according to Embodiment 4. In the figures, the value of the focal length is a value obtained when expressing Numerical Embodiment in units of mm, and the same applies to Numerical Embodiments below. In aberration diagrams, the spherical aberration is illustrated with respect to the e-Line and the g-Line. The astigmatism is illustrated on the meridional image plane (ΔM) with respect to the e-Line and on the sagittal image plane (ΔS) with respect to the e-Line. The lateral chromatic aberration is expressed by the g-Line. In all of the aberration diagrams, the spherical aberration, the astigmatism, the distortion, and the lateral chromatic aberration are drawn on scales of 0.5 mm, 0.5 mm, 5%, and 0.05 mm, respectively. Symbol Fno represents the F-number, and symbol ω represents the half angle of field. Note that, the wide angle end and the telephoto end refer to the zoom positions when the second lens unit U2 for zooming is located at both ends of the range in which the second lens unit U2 is mechanically movable on the optical axis.

Table 1 shows corresponding values of the conditional expressions of Numerical Embodiment 4. Numerical Embodiment 4 satisfies all of the conditional expressions (1) to (7). The zoom lens in this Embodiment is small and lightweight despite being the zoom lens for the large format camera, and attains the high zoom ratio with a zoom ratio of 20.0×, a half angle of field at the wide angle end of 20.3 degrees, and a half angle of field at the telephoto end of 1.1 degrees, and the high optical performance over the entire zoom range from the wide angle end to the telephoto end.

Embodiment 5

Figure 9:
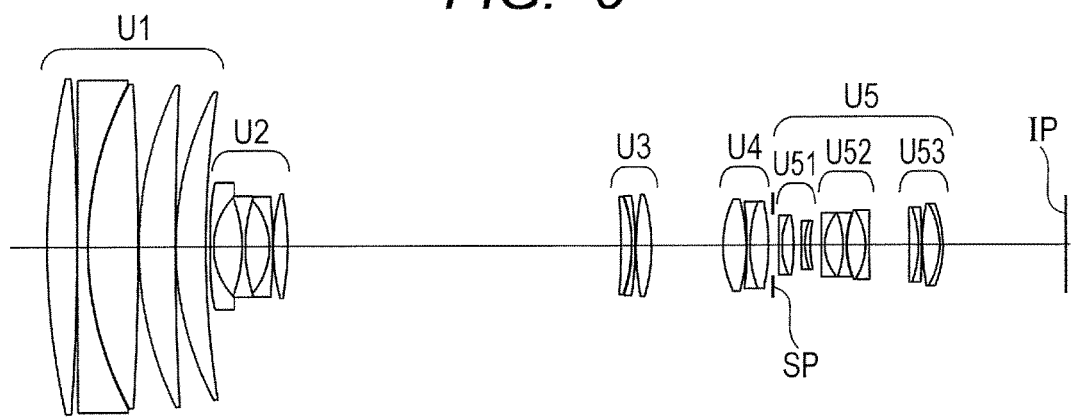
FIG. 9 is a lens cross-sectional view when focus is at infinity at a wide angle end in a zoom lens according to Embodiment 5 of the present invention.

FIG. 9 is a lens cross-sectional view when focus is at the object at infinity at the wide angle end in the zoom lens according to Embodiment 5. The zoom lens according to Embodiment 5 of the present invention includes, in order from the object side, a first lens unit having a positive refractive power that does not move for zooming, a second lens unit having a negative refractive power that moves during zooming, at least one lens unit that moves during zooming, and a rear lens unit including an aperture stop.

Figure 14A:
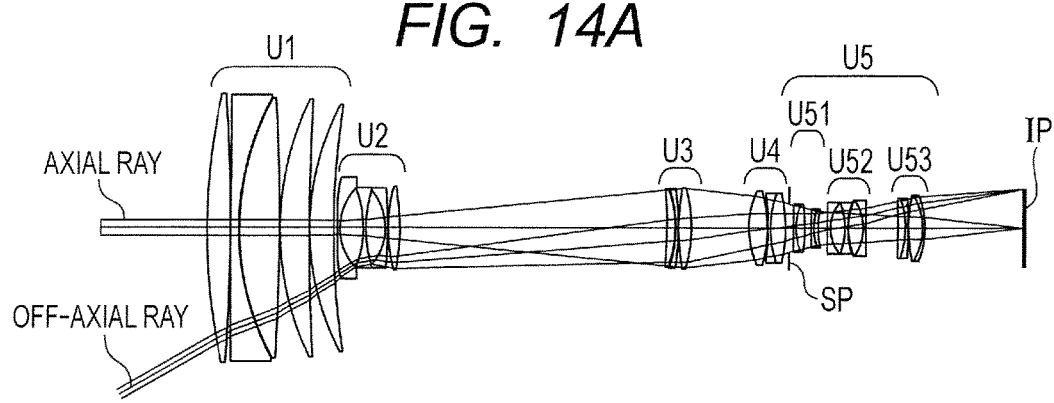
FIG. 14A is an optical path diagram when the focus is at an object at infinity at the wide angle end in Embodiment 6.
Figure 14B:
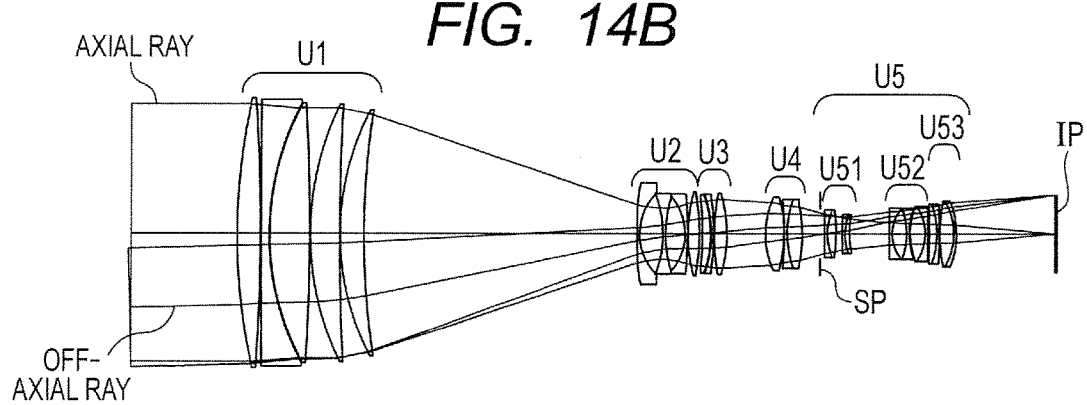
FIG. 14B is an optical path diagram when the focus is at the object at infinity at the telephoto end in Embodiment 6.

FIGS. 14A and 14B are optical path diagrams when the focus is at the object at infinity at the wide angle end and the telephoto end, respectively, in Embodiment 5. An axial ray passing through the second sub lens unit U52 is substantially afocal, and a height of the axial ray from the optical axis is substantially constant at the wide angle end and the telephoto end. Therefore, an effect of the second sub lens unit U52 being moved during zooming on variations during zooming in axial aberrations such as the spherical aberration and the axial chromatic aberration is small. On the other hand, a height of an off-axial ray passing through the second sub lens unit U52 from the optical axis is higher at the telephoto end than at the wide angle end. Therefore, the second sub lens unit U52 may be moved during zooming to effectively correct the variations during zooming in off-axial aberrations such as a field curvature and the lateral chromatic aberration.

The first lens unit U1 is a lens unit having the positive refractive power that does not move for zooming. The second lens unit U2 is a variator lens unit having a negative refractive power for zooming that moves toward the image side during zooming from the wide angle end (short focal length end) to the telephoto end (long focal length end). The "at least one lens unit that moves during zooming" in this Embodiment includes, in order from the object side to the image side, a third lens unit U3 and a fourth lens unit U4. The third lens unit U3 is a variator lens unit having a positive refractive power for zooming that moves during zooming from the wide angle end (short focal length end) to the telephoto end (long focal length end). The fourth lens unit U4 is a compensator lens unit having a positive refractive power that moves in conjunction with the second lens unit U2 and the third lens unit U3 to correct the image plane variation accompanying zooming. Moreover, the fourth lens unit U4 that moves toward the object side during focusing from the object at infinity to an object at close distance. In this Embodiment, the rear lens unit is represented by U5 in the figures and includes, in order from the object side to the image side, the aperture stop SP that does not move for zooming, a first sub lens unit U51 having a negative refractive power, a third sub lens unit U53 having a positive refractive power, and a second sub lens unit U52 having a negative refractive power that moves toward the image side during zooming.

The lens units in Embodiment 5 have the following configurations in order from the object side to the image side. The first lens unit U1 includes a positive lens, a negative lens, and three positive lenses. The second lens unit U2 includes three negative lenses and a positive lens. The third lens unit U3 includes a positive lens, a negative lens, and a positive lens. The fourth lens unit U4 includes a positive lens and a cemented lens of a negative lens and a positive lens. The fifth lens unit U5 includes the aperture stop 5P, a first sub lens unit U51 including two cemented lenses of a negative lens and a positive lens, a second sub lens unit U52 including a cemented lens of a negative lens and a positive lens, and a cemented lens of a negative lens, a positive lens, and a negative lens, and a third sub lens unit U53 including two cemented lenses of a positive lens and a negative lens.

Numerical Embodiment corresponding to Embodiment 5 is described in <Numerical Embodiment 5> below.

Figure 10A:
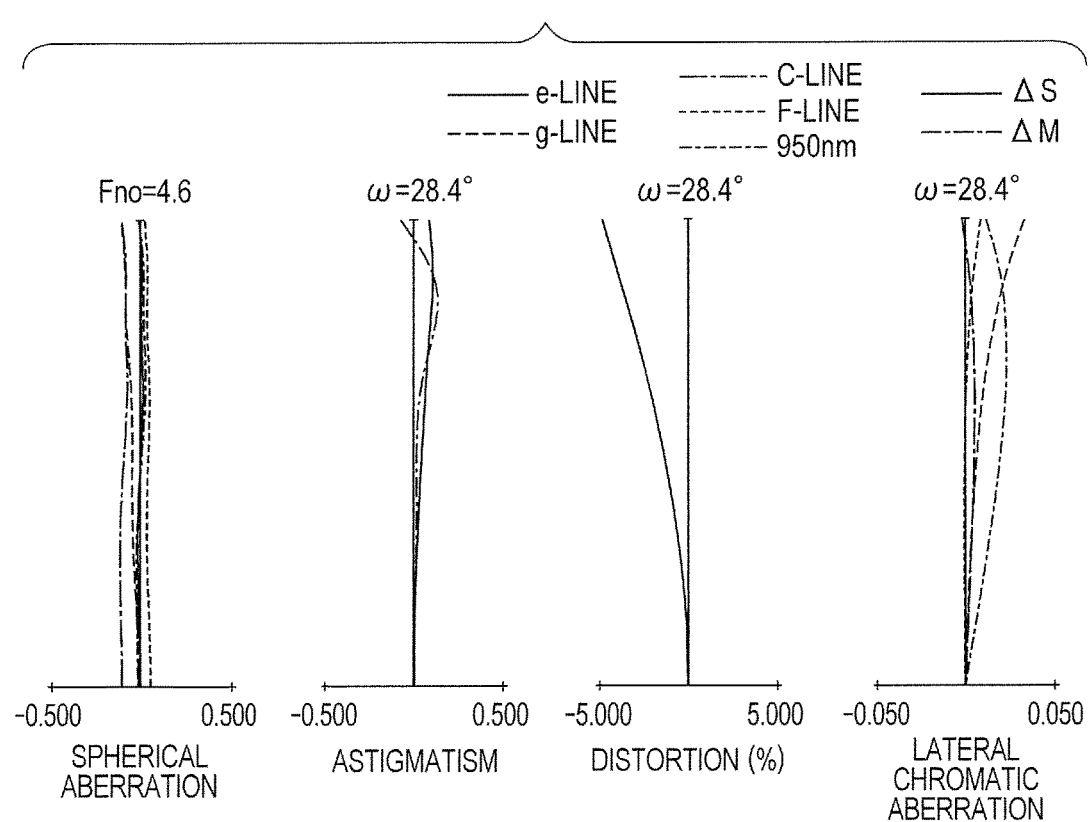
FIG. 10A is a longitudinal aberration diagram when the focus is at infinity at the wide angle end in Embodiment 5.
Figure 10B:
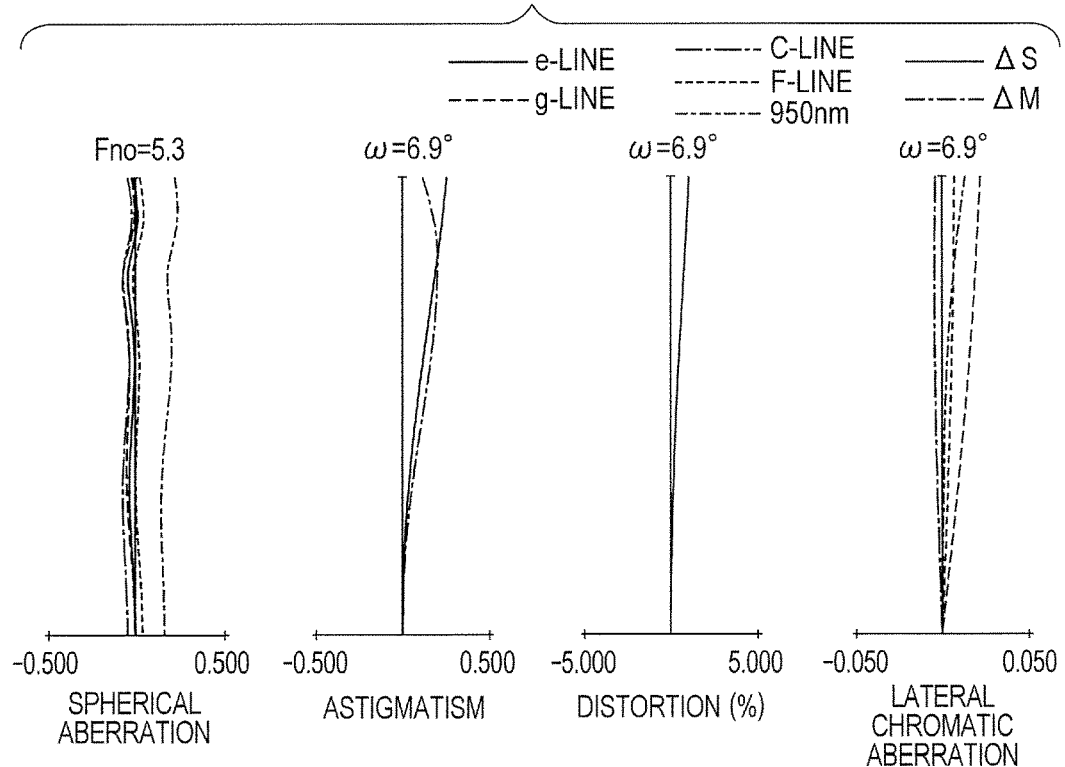
FIG. 10B is a longitudinal aberration diagram when the focus is at infinity at a focal length of 180.00 mm in Embodiment 5.
Figure 10C:
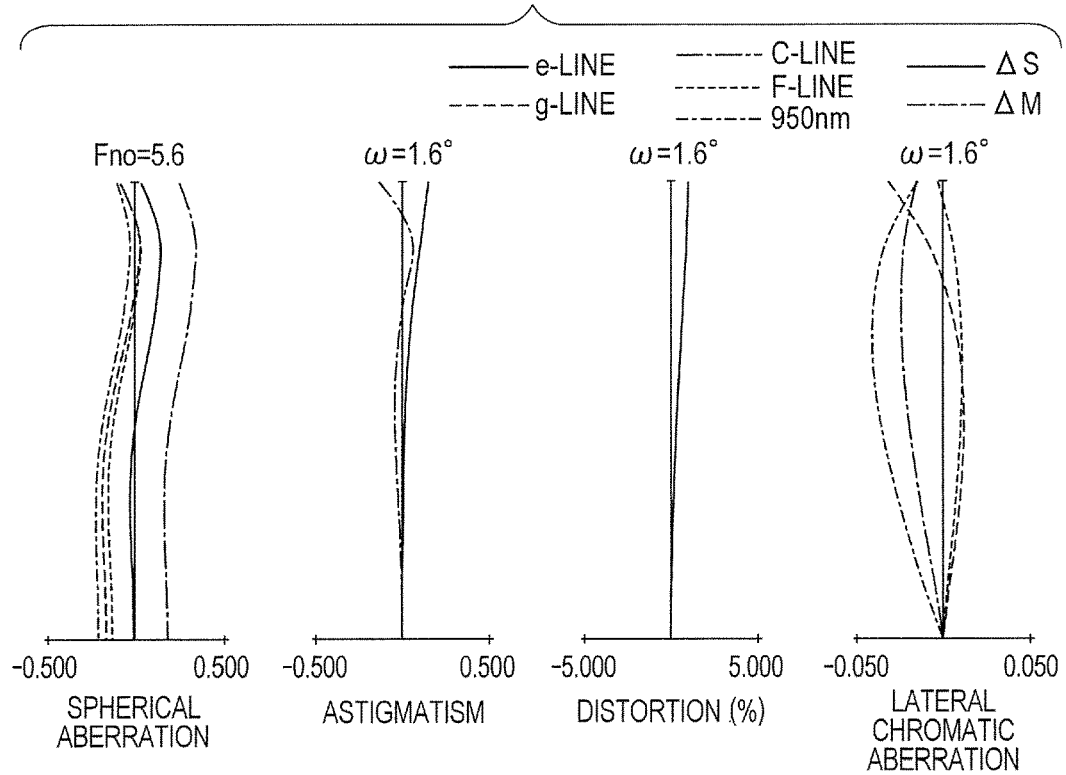
FIG. 10C is a longitudinal aberration diagram when the focus is at infinity at a telephoto end in Embodiment 5.

FIGS. 10A, 10B, and 10C are longitudinal aberration diagrams when the focus is at infinity at the wide angle end, a focal length of 180.00 mm, and the telephoto end, respectively, in the zoom lens according to Embodiment 5. In the figures, the value of the focal length is a value obtained when expressing Numerical Embodiment in units of mm, and the same applies to Numerical Embodiments below. In aberration diagrams, the spherical aberration is illustrated with respect to the e-Line, the g-Line, a C-Line, an F-Line, and 950 nm. The astigmatism is illustrated on the meridional image plane (ΔM) with respect to the e-Line and on the sagittal image plane (ΔS) with respect to the e-Line. The lateral chromatic aberration is expressed by the g-Line, the C-Line, the F-Line, and 950 nm. In all of the aberration diagrams, the spherical aberration, the astigmatism, the distortion, and the lateral chromatic aberration are drawn on scales of 0.5 mm, 0.5 mm, 5%, and 0.05 mm, respectively. Symbol Fno represents the F-number, and symbol ω represents the half angle of field. Note that, the wide angle end and the telephoto end refer to the zoom positions when the second lens unit U2 for zooming is located at both ends of the range in which the second lens unit U2 is mechanically movable on the optical axis.

Table 1 shows corresponding values of the conditional expressions of Numerical Embodiment 5. Numerical Embodiment 5 satisfies all of the conditional expressions (1) to (7). The zoom lens in this Embodiment is small and lightweight despite being the zoom lens for the large format camera, and attains the high zoom ratio with a zoom ratio of 20.0×, a half angle of field at the wide angle end of 28.4 degrees, and a half angle of field at the telephoto end of 1.6 degrees, and the high optical performance over the entire zoom range from the wide angle end to the telephoto end.

Embodiment 6

Figure 11:
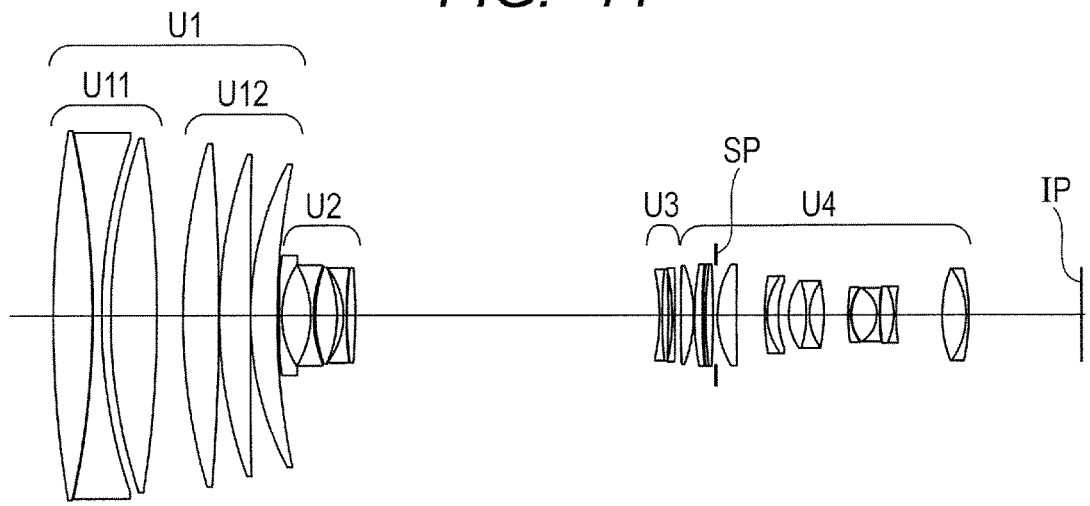
FIG. 11 is a lens cross-sectional view when focus is at infinity at a wide angle end in a zoom lens according to Embodiment 6 of the present invention.

FIG. 11 is a lens cross-sectional view when the focus is at the object at infinity at the wide angle end in the zoom lens according to Embodiment 6. The zoom lens according to Embodiment 6 of the present invention includes, in order from the object side, a first lens unit having a positive refractive power that does not move for zooming, a second lens unit having a negative refractive power that moves during zooming, at least one lens unit that moves during zooming, and a rear lens unit including an aperture stop.

The first lens unit U1 is a lens unit having a positive refractive power that does not move for zooming. Moreover, the first lens unit U1 includes a first sub lens unit U11 and a second sub lens unit U12, and the second sub lens unit U12 that moves toward the object side during focus adjustment from the object at infinity to the object at close distance. The second lens unit U2 that moves during zooming to play a role of zooming. The "at least one lens unit that moves during zooming" in this Embodiment is a third lens unit U3 that moves during zooming to play a role of correcting the image plane variation accompanying zooming. In this Embodiment, the rear lens unit includes a fourth lens unit U4 (relay lens unit) that does not move for zooming, includes the aperture stop SP, and has a positive refractive power.

In Embodiment 6, the first lens unit U1 includes the first sub lens unit U11 including a positive lens, a negative lens, and a positive lens, and the second sub lens unit U12 including three positive lenses that move during focus adjustment. The second lens unit U2 includes two negative lenses, a positive lens, a negative lens, and a positive lens. The third lens unit U3 includes a cemented lens of a negative lens and a positive lens, and a negative lens. The fourth lens unit U4 includes two positive lenses, a cemented lens of a negative lens and a positive lens, the aperture stop SP, a positive lens, a cemented lens of a negative lens and a positive lens, a cemented lens of a positive lens, a negative lens, and a positive lens, a negative lens, and three cemented lenses of a positive lens and a negative lens.

The zoom lens in Embodiment 6 attains a zoom ratio of 20.0×, a half angle of field at the wide angle end of 28.4 degrees, and a half angle of field at the telephoto end of 1.6 degrees.

Numerical Embodiment corresponding to Embodiment 6 is described in <Numerical Embodiment 6> below.

Figure 12A:
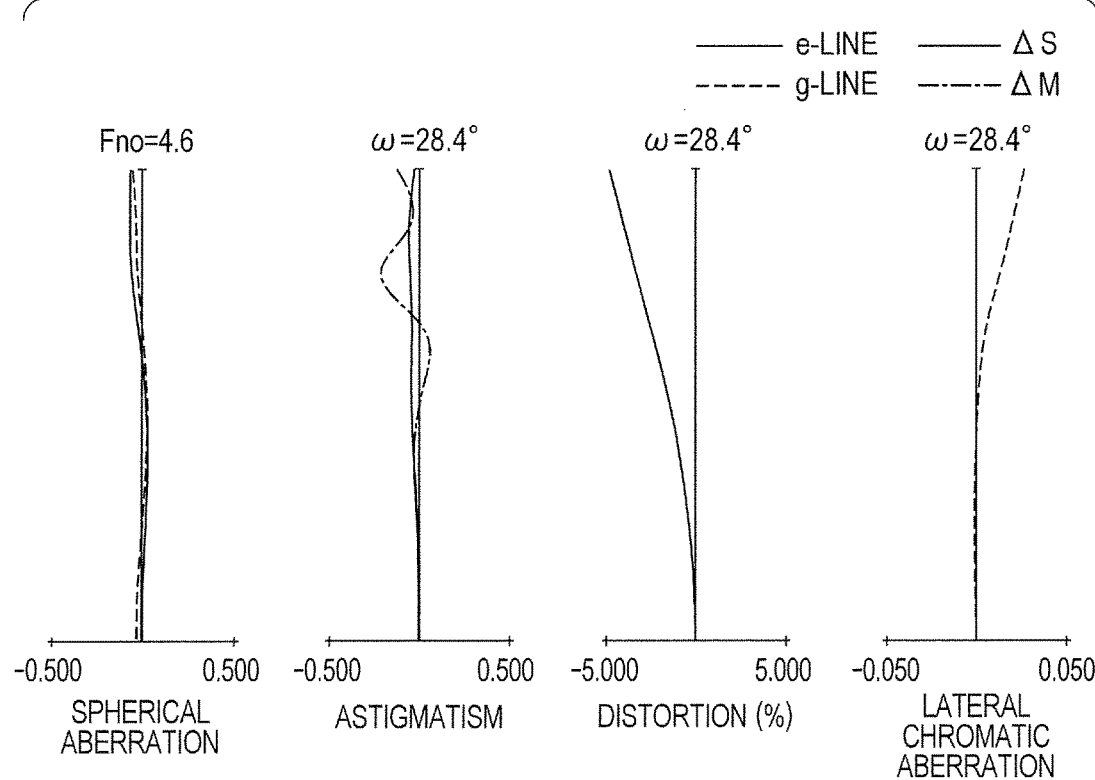
FIG. 12A is a longitudinal aberration diagram when the focus is at infinity at the wide angle end in Embodiment 6.
Figure 12B:
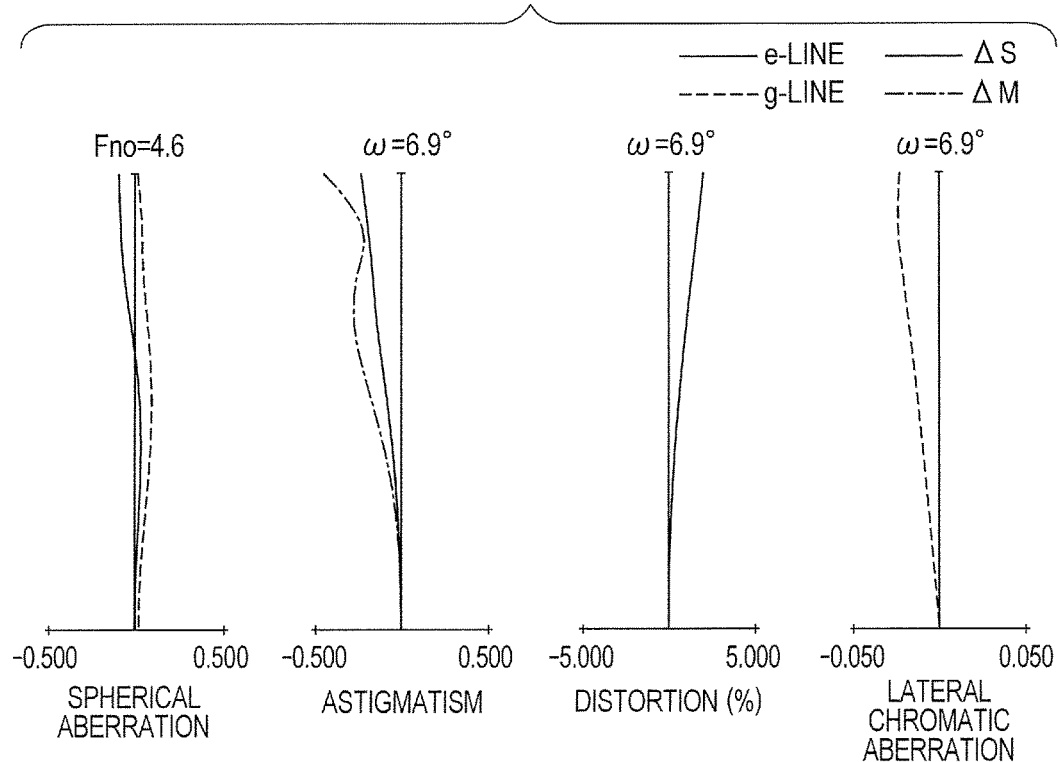
FIG. 12B is a longitudinal aberration diagram when the focus is at infinity at a focal length of 180.00 mm in Embodiment 6.
Figure 12C:
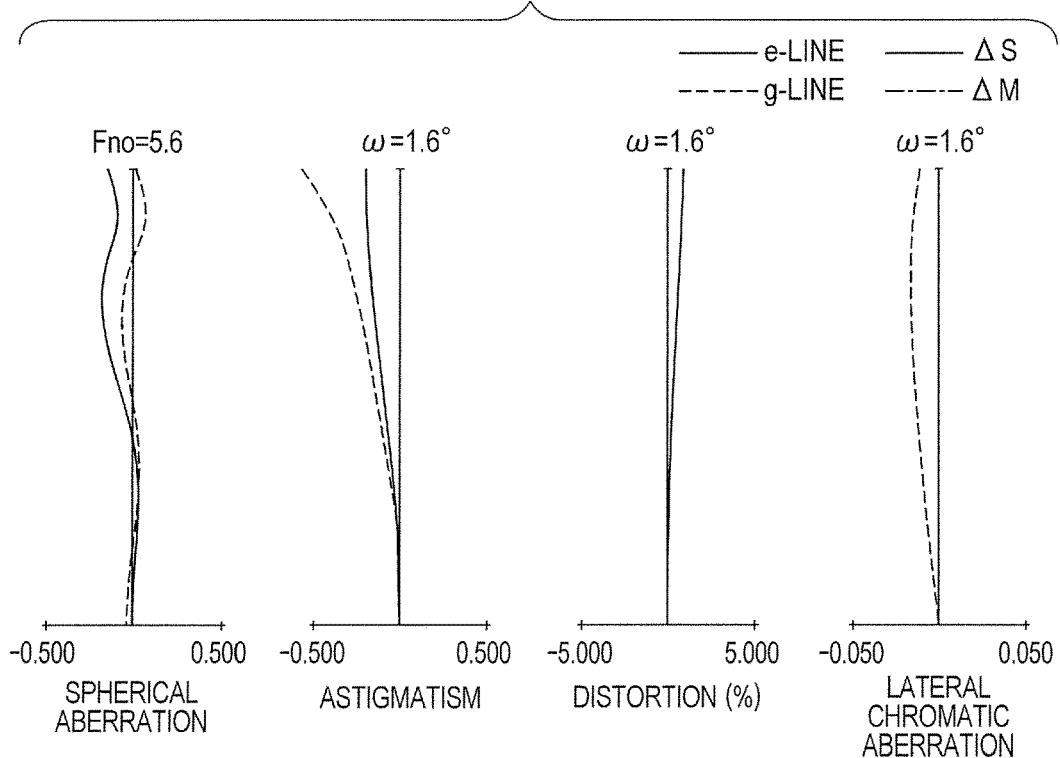
FIG. 12C is a longitudinal aberration diagram when the focus is at infinity at a telephoto end in Embodiment 6.

FIGS. 12A, 12B, and 12C are longitudinal aberration diagrams when the focus is at infinity at the wide angle end, a focal length of 180.00 mm, and the telephoto end, respectively, in the zoom lens according to Embodiment 6. In the figures, the value of the focal length is a value obtained when expressing Numerical Embodiment in units of mm, and the same applies to Numerical Embodiments below. In aberration diagrams, the spherical aberration is illustrated with respect to the e-Line and the g-Line. The astigmatism is illustrated on the meridional image plane (ΔM) with respect to the e-Line and on the sagittal image plane (ΔS) with respect to the e-Line. The lateral chromatic aberration is expressed by the g-Line. In all of the aberration diagrams, the spherical aberration, the astigmatism, the distortion, and the lateral chromatic aberration are drawn on scales of 0.5 mm, 0.5 mm, 5%, and 0.05 mm, respectively. Symbol Fno represents the F-number, and symbol ω represents the half angle of field. Note that, the wide angle end and the telephoto end refer to the zoom positions when the second lens unit U2 for zooming is located at both ends of the range in which the second lens unit U2 is mechanically movable on the optical axis.

Table 1 shows corresponding values of the conditional expressions of Numerical Embodiment 6. Numerical Embodiment 6 satisfies all of the conditional expressions (1) to (7). The zoom lens in this Embodiment is small and lightweight despite being the zoom lens for the large format camera, and attains the high zoom ratio with a zoom ratio of 20.0×, a half angle of field at the wide angle end of 28.4 degrees, and a half angle of field at the telephoto end of 1.6 degrees, and the high optical performance over the entire zoom range from the wide angle end to the telephoto end.

Embodiment 7

Figure 13:
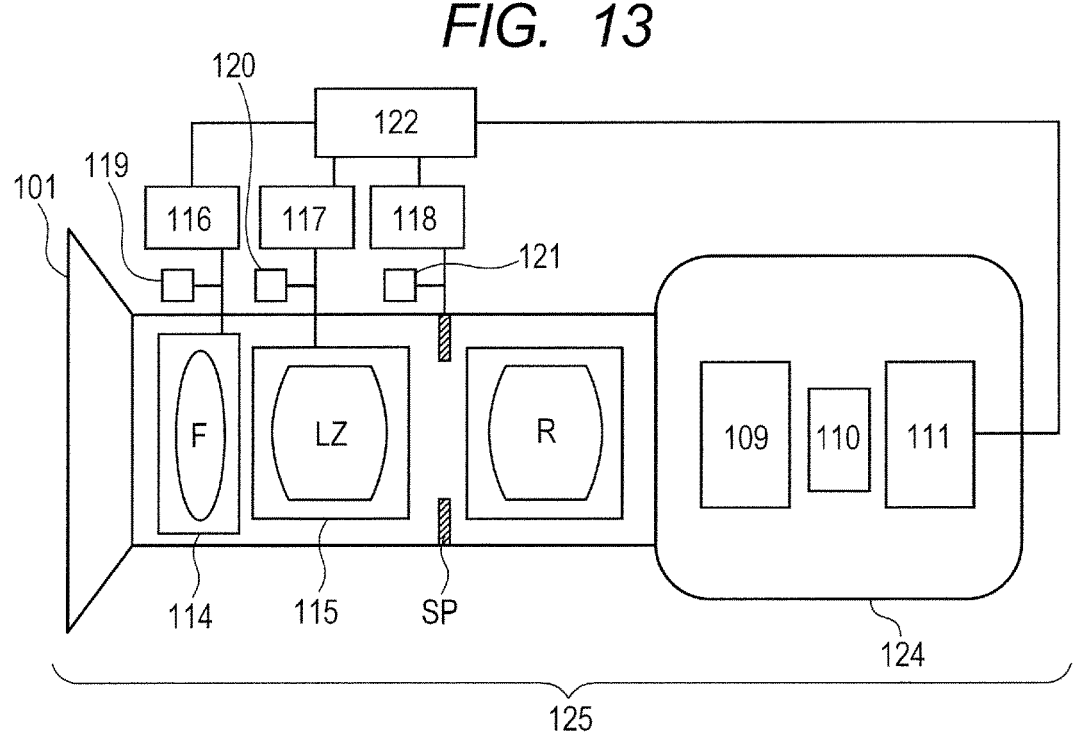
FIG. 13 is a schematic diagram of a main part of an image pickup apparatus according to the present invention.

In Embodiment 7, referring to FIG. 13, a brief description is given of an image pickup apparatus (television camera system) using the zoom lens according to each of Embodiments (Numerical Embodiments) as a photographing optical system. FIG. 13 is a schematic diagram of a main part of the image pickup apparatus according to the present invention. In FIG. 13, an image pickup apparatus 125 includes a zoom lens 101 according to any one of Numerical Embodiments 1 to 6, and a camera 124. The zoom lens 101 is removably mounted to the camera 124. The image pickup apparatus 125 is constructed by mounting the zoom lens 101 to the camera 124.

The zoom lens 101 includes a first lens unit F, a zoom lens unit LZ, and a rear lens unit R for imaging. The first lens unit F or the zoom lens unit LZ includes a lens unit for focus adjustment. The zoom lens unit LZ includes a lens unit that moves on the optical axis for zooming and a lens unit that moves on the optical axis for correcting the image plane variation accompanying zooming. The rear lens unit R for imaging includes the aperture stop SP.

A lens unit IE that moves in the focal length range of the entire system of the zoom lens 101.

Drive mechanisms 114 and 115, such as a helicoid and a cam, drive the first lens unit F and the zoom lens unit LZ in an optical axis direction, respectively. Motors (drive units) 116 to 118 electrically drive the drive mechanisms 114 and 115 and the aperture stop SP. Detectors 119 to 121, such as an encoder, a potentiometer, or a photo-sensor that detect positions of the first lens unit F and the zoom lens unit LZ on the optical axis, and an aperture diameter of the aperture stop SP. The camera 124 includes a glass block 109, which corresponds to an optical filter or a color separation prism provided within the camera 124. Further, the camera 124 includes a solid state image pickup element (photoelectric transducer) 110, such as a charge-coupled device (CCD) sensor or a complementary metal-oxide semiconductor (CMOS) sensor. The solid state image pickup element 110 that receives a subject image formed by the zoom lens 101. Further, central processing units (CPUs) 111 and 122 control the driving of the camera 124 and the zoom lens 101.

By applying the zoom lens according to the present invention to a television camera as described above, the image pickup apparatus having the high optical performance may be realized.

Numerical Embodiment 1

Surface data

| Surface number | r | d | nd | vd | Effective diameter |
|---|---|---|---|---|---|
| 1 | 322.060 | 15.85 | 1.43387 | 95.1 | 144.38 |
| 2 | −561.835 | 0.20 | 1 | | 142.80 |
| 3 | −1053.084 | 4.50 | 1.72916 | 54.7 | 141.67 |
| 4 | 150.529 | 1.17 | 1 | | 138.78 |
| 5 | 150.029 | 23.11 | 1.43387 | 95.1 | 139.70 |
| 6 | −872.351 | 0.20 | 1 | | 139.89 |
| 7 | 167.827 | 16.77 | 1.43387 | 95.1 | 140.27 |
| 8 | 2068.554 | 0.20 | 1 | | 139.60 |
| 9 | 136.426 | 14.91 | 1.43387 | 95.1 | 133.89 |
| 10 | 438.209 | (Variable) | 1 | | 132.53 |
| 11* | 632.290 | 1.50 | 1.53715 | 74.8 | 51.90 |
| 12 | 31.090 | 12.63 | 1 | | 41.46 |
| 13 | −49.863 | 1.50 | 1.53715 | 74.8 | 41.14 |
| 14 | 72.781 | 9.70 | 1 | | 38.75 |
| 15 | −31.818 | 1.50 | 1.53715 | 74.8 | 38.68 |
| 16 | −179.190 | 0.50 | 1 | | 41.60 |
| 17 | 86.827 | 7.04 | 1.65412 | 39.7 | 44.03 |
| 18* | −71.085 | (Variable) | 1 | | 44.17 |
| 19 | 183.198 | 7.12 | 1.51742 | 52.4 | 43.04 |
| 20 | −62.377 | 0.20 | 1 | | 43.13 |
| 21 | −76.444 | 1.50 | 1.90200 | 25.1 | 42.81 |
| 22 | 851.985 | 0.20 | 1 | | 43.35 |
| 23* | 87.377 | 7.20 | 1.51742 | 52.4 | 43.94 |
| 24 | −85.691 | (Variable) | 1 | | 44.05 |
| 25 | 47.110 | 9.21 | 1.53715 | 74.8 | 40.20 |
| 26 | −75.770 | 0.20 | 1 | | 39.46 |
| 27* | −161.231 | 1.50 | 1.77250 | 49.6 | 38.03 |
| 28 | 36.474 | 8.42 | 1.53715 | 74.8 | 35.50 |
| 29 | −88.021 | (Variable) | 1 | | 35.03 |
| 30 (Stop) | ∞ | 2.50 | 1 | | 29.14 |
| 31 | −3203.415 | 1.50 | 1.88300 | 40.8 | 27.29 |
| 32 | 33.206 | 7.00 | 1.59270 | −35.3 | 25.76 |
| 33 | −59.743 | 0.20 | 1 | | 24.86 |
| 34 | −341.630 | 1.50 | 1.88300 | 40.8 | 23.83 |
| 35 | 23.827 | 5.46 | 1.59270 | 35.3 | 22.22 |
| 36 | 214.783 | 0.90 | 1 | | 21.50 |
| 37 | 255.490 | 1.50 | 1.88300 | 40.8 | 21.23 |
| 38 | 23.670 | 7.96 | 1.85478 | 24.8 | 20.46 |
| 39 | −82.946 | 1.50 | 1.88300 | 40.8 | 20.25 |
| 40 | 69.429 | 0.20 | 1 | | 20.42 |
| 41 | 51.937 | 7.06 | 1.85478 | 24.8 | 20.61 |
| 42 | −52.719 | 1.50 | 1.88300 | 40.8 | 20.68 |
| 43 | 57.414 | 21.89 | 1 | | 20.75 |
| 44 | 263.495 | 3.94 | 1.53172 | 48.8 | 28.76 |
| 45 | −61.741 | 1.50 | 1.95906 | 17.5 | 29.12 |
| 46 | 192.038 | 0.20 | 1 | | 30.14 |
| 47 | 62.143 | 6.68 | 1.53172 | 48.8 | 31.30 |
| 48 | −46.182 | 1.50 | 1.95906 | 17.5 | 31.75 |
| 49 | −64.474 | | 1 | | 32.54 |
| Image plane | ∞ | | | | |

Aspherical surface data

Eleventh surface

K = 0.00000e+000  A4 = 2.87407e−006  A6 = −9.87572e−010
A8 = 2.85037e−012  A10 = −4.14374e−015  A12 = 3.90023e−018

Eighteenth surface

K = 0.00000e+000  A4 = 2.92304e−006  A6 = 1.18582e−009
A8 = −4.62922e−013  A10 = 1.31730e−015  A12 = −9.42211e−019

Twenty-third surface

K = 0.00000e+000  A4 = −1.91661e−006  A6 = −4.52468e−010
A8 = 4.64191e−013  A10 = −1.09395e−015  A12 = 5.73853e−019

Twenty-seventh surface

K = 0.00000e+000  A4 = −1.73820e−006  A6 = 2.71278e−010
A8 = 2.02182e−012  A10 = −6.46061e−015  A12 = 6.25473e−018

Various data
Zoom ratio 20.00

| | Wide angle | Intermediate | Telephoto |
|---|---|---|---|
| Focal length | 40.00 | 180.00 | 800.01 |
| F-number | 4.60 | 5.36 | 5.60 |
| Angle of field | 28.42 | 6.86 | 1.55 |
| Image height | 21.65 | 21.65 | 21.65 |
| Total lens length | 455.50 | 455.50 | 455.50 |
| BF | 55.06 | 55.06 | 55.06 |
| d10 | 2.00 | 98.90 | 151.82 |
| d18 | 150.89 | 51.21 | 1.50 |
| d24 | 24.24 | 14.85 | 17.13 |
| d29 | 1.99 | 14.16 | 8.67 |
| Entrance pupil position | 107.23 | 519.10 | 2512.83 |
| Exit pupil position | −62.78 | −62.78 | −62.78 |
| Front principal point position | 133.65 | 424.16 | −2118.25 |
| Rear principal point position | 15.06 | −124.94 | −744.95 |

Zoom lens unit data

| Unit | First surface | Focal length | Lens structure length | Front principal point position | Rear principal point position |
|---|---|---|---|---|---|
| 1 | 1 | 220.00 | 76.90 | 33.42 | −20.78 |
| 2 | 11 | −33.00 | 34.38 | 3.10 | −30.02 |
| 3 | 19 | 100.00 | 16.22 | 7.40 | −3.43 |
| 4 | 25 | 77.00 | 19.33 | 3.44 | −9.65 |
| 5 | 30 | −49.29 | 74.49 | 4.50 | −58.66 |

Numerical Embodiment 2

Surface data

| Surface number | r | d | nd | vd | Effective diameter |
|---|---|---|---|---|---|
| 1 | 309.463 | 16.60 | 1.43387 | 95.1 | 154.77 |
| 2 | −796.747 | 0.20 | 1 | | 154.24 |
| 3 | −3147.021 | 4.50 | 1.72916 | 54.7 | 153.21 |
| 4 | 153.581 | 0.29 | 1 | | 148.91 |
| 5 | 152.879 | 25.01 | 1.43387 | 95.1 | 149.17 |
| 6 | −1082.423 | 0.20 | 1 | | 149.20 |
| 7 | 166.085 | 19.51 | 1.43387 | 95.1 | 148.33 |
| 8 | 1728.054 | 0.20 | 1 | | 147.17 |
| 9 | 141.414 | 16.30 | 1.43387 | 95.1 | 139.79 |
| 10 | 469.895 | (Variable) | 1 | | 137.94 |
| 11* | 140.220 | 1.50 | 1.53715 | 74.8 | 53.82 |
| 12 | 35.668 | 12.40 | 1 | | 45.60 |
| 13 | −173.953 | 1.50 | 1.53715 | 74.8 | 42.36 |
| 14 | 98.820 | 7.67 | 1 | | 39.65 |
| 15 | −40.525 | 1.50 | 1.59522 | 67.7 | 39.27 |
| 16 | 59.876 | 0.19 | 1 | | 39.89 |
| 17 | 48.642 | 5.52 | 1.72047 | 34.7 | 40.57 |
| 18* | −1495.589 | (Variable) | 1 | | 40.44 |
| 19 | 64.955 | 10.22 | 1.43875 | 94.9 | 52.76 |
| 20 | −122.301 | 0.20 | 1 | | 52.56 |
| 21 | −171.372 | 1.70 | 2.00069 | 25.5 | 52.17 |
| 22 | 28261.585 | 0.20 | 1 | | 52.09 |
| 23* | 172.482 | 5.93 | 1.49700 | 81.5 | 52.02 |
| 24 | −129.888 | (Variable) | 1 | | 51.89 |
| 25 | 44.114 | 8.96 | 1.49700 | 81.5 | 41.51 |
| 26 | −97.659 | 0.20 | 1 | | 40.77 |
| 27* | −310.687 | 1.50 | 1.77250 | 49.6 | 39.23 |
| 28 | 87.110 | 4.54 | 1.49700 | 81.5 | 37.40 |
| 29 | −261.144 | (Variable) | 1 | | 36.63 |
| 30 (Stop) | ∞ | 2.50 | 1 | | 30.68 |
| 31 | 242.016 | 1.50 | 1.88300 | 40.8 | 28.2 |
| 32 | 23.168 | 7.96 | 1.59270 | 35.3 | 25.77 |
| 33 | −69.912 | 2.68 | 1 | | 24.75 |
| 34 | 107.234 | 1.50 | 1.88300 | 40.8 | 21.13 |
| 35 | 20.680 | 3.42 | 1.59270 | 35.3 | 19.36 |
| 36 | 63.981 | (Variable) | 1 | | 18.63 |
| 37 | −56.252 | 1.50 | 1.88300 | 40.8 | 17.34 |
| 38 | 41.889 | 0.19 | 1 | | 17.00 |
| 39 | 32.689 | 7.69 | 1.85478 | 24.8 | 17.07 |
| 40 | −26.389 | 1.50 | 1.88300 | 40.8 | 17.66 |
| 41 | 36.873 | 0.20 | 1 | | 18.23 |
| 42 | 36.185 | 8.15 | 1.85478 | 24.8 | 18.43 |
| 43 | −24.954 | 1.50 | 1.88300 | 40.8 | 19.12 |
| 44 | 48.974 | (Variable) | 1 | | 19.77 |
| 45 | 63.097 | 9.88 | 1.53172 | 48.8 | 26.98 |
| 46 | −32.051 | 1.50 | 1.95906 | 17.5 | 28.36 |
| 47 | −103.359 | 0.20 | 1 | | 29.93 |
| 48 | 70.421 | 11.48 | 1.53172 | 48.8 | 31.63 |
| 49 | −30.910 | 1.50 | 1.95906 | 17.5 | 32.53 |
| 50 | −54.654 | | 1 | | 33.90 |
| Image plane | ∞ | | | | |

Aspherical surface data

Eleventh surface

K = 0.00000e+000  A4 = 5.19683e−007  A6 = 1.73681e−009
A8 = −1.50609e−012  A10 = 1.43359e−015  A12 = 1.52701e−019

Eighteenth surface

K = 0.00000e+000  A4 = 2.12056e−006  A6 = 3.22748e−009
A8 = −4.68497e−012  A10 = 1.02585e−014  A12 = −8.52497e−018

Twenty-third surface

K = 0.00000e+000  A4 = −1.18543e−006  A6 = −8.02896e−011
A8 = −8.20631e−014  A10 = 1.16608e−016  A12 = −6.41427e−020

Twenty-seventh surface

K = 0.00000e+000  A4 = −1.70895e−006  A6 = 3.36974e−010
A8 = −6.60188e−013  A10 = 1.19349e−015  A12 = −1.04914e−018

Various data
Zoom ratio 30.00

| | Wide angle | Intermediate | Telephoto |
|---|---|---|---|
| Focal length | 50.00 | 274.00 | 1500.08 |
| F-number | 4.60 | 5.53 | 9.82 |
| Angle of field | 23.41 | 4.52 | 0.83 |
| Image height | 21.65 | 21.65 | 21.65 |
| Total lens length | 491.04 | 491.04 | 491.04 |
| BF | 55.11 | 55.11 | 55.11 |
| d10 | 7.38 | 107.00 | 140.37 |
| d18 | 166.85 | 72.50 | 1.50 |
| d24 | 34.64 | 18.19 | 65.96 |
| d29 | 2.00 | 13.19 | 3.05 |
| d36 | 3.85 | 6.90 | 12.65 |
| d44 | 9.80 | 6.75 | 1.00 |
| Entrance pupil position | 139.06 | 842.29 | 5080.32 |
| Exit pupil position | −77.29 | −69.39 | −55.99 |
| Front principal point position | 170.17 | 513.30 | −13673.40 |
| Rear principal point position | 5.11 | −218.89 | −1444.97 |

Zoom lens unit data

| Unit | First surface | Focal length | Lens structure length | Front principal point position | Rear principal point position |
|---|---|---|---|---|---|
| 1 | 1 | 215.00 | 82.80 | 32.99 | −25.39 |
| 2 | 11 | −30.50 | 30.29 | 10.33 | −14.22 |
| 3 | 19 | 92.50 | 18.24 | 4.95 | −7.75 |
| 4 | 25 | 80.00 | 15.20 | 0.96 | −9.21 |
| 5 | 30 | −63.66 | 19.57 | 10.42 | −3.00 |
| 6 | 37 | −30.09 | 20.74 | 6.19 | −4.18 |
| 7 | 45 | 67.56 | 24.57 | 7.17 | −9.40 |

Numerical Embodiment 3

Surface data

| Surface number | r | d | nd | vd | Effective diameter |
|---|---|---|---|---|---|
| 1 | 323.583 | 20.69 | 1.43387 | 95.1 | 154.53 |
| 2 | −474.993 | 0.20 | 1 | | 151.81 |
| 3 | −548.786 | 4.50 | 1.72916 | 54.7 | 150.72 |
| 4 | 177.844 | 4.74 | 1 | | 141.29 |
| 5 | 177.453 | 22.50 | 1.43387 | 95.1 | 141.41 |
| 6 | −559.198 | 0.20 | 1 | | 140.67 |
| 7 | 213.284 | 16.10 | 1.43387 | 95.1 | 137.41 |
| 8 | −3234.199 | 0.20 | 1 | | 136.58 |
| 9 | 153.517 | 14.92 | 1.43387 | 95.1 | 131.56 |
| 10 | 558.979 | (Variable) | 1 | | 129.61 |
| 11* | 391.648 | 1.50 | 1.53715 | 74.8 | 58.53 |
| 12 | 35.008 | 13.78 | 1 | | 48.28 |
| 13 | −76.088 | 1.50 | 1.53715 | 74.8 | 48.11 |
| 14 | 208.735 | 8.23 | 1 | | 46.76 |
| 15 | −45.774 | 1.50 | 1.53715 | 74.8 | 46.66 |
| 16 | −175.487 | 0.50 | 1 | | 48.45 |
| 17 | 116.939 | 6.28 | 1.80000 | 29.8 | 49.87 |
| 18* | −316.657 | (Variable) | 1 | | 49.76 |
| 19 | 137.482 | 8.29 | 1.51742 | 52.4 | 45.15 |
| 20 | −60.464 | 0.63 | 1 | | 45.33 |
| 21 | −65.600 | 1.50 | 1.90200 | 25.1 | 45.02 |
| 22 | −489.271 | 0.20 | 1 | | 45.98 |
| 23* | 108.086 | 6.81 | 1.51742 | 52.4 | 46.80 |
| 24 | −102.805 | (Variable) | 1 | | 47.00 |
| 25 | 44.079 | 12.04 | 1.53715 | 74.8 | 45.45 |
| 26 | −86.609 | 0.20 | 1 | | 44.12 |
| 27* | −258.212 | 1.50 | 1.77250 | 49.6 | 41.86 |
| 28 | 33.953 | 9.60 | 1.53715 | 74.8 | 38.00 |
| 29 | −101.992 | (Variable) | 1 | | 37.33 |
| 30 (Stop) | ∞ | 2.50 | 1 | | 27.69 |
| 31 | −128.577 | 1.50 | 1.88300 | 40.8 | 26.30 |
| 32 | 29.387 | 6.38 | 1.59270 | 35.3 | 24.91 |

-continued

| | | | | | |
|---|---|---|---|---|---|
| 33 | −43.762 | 0.20 | 1 | | 24.61 |
| 34 | −489.500 | 1.50 | 1.88300 | 40.8 | 23.38 |
| 35 | −155.569 | 1.00 | 1.59270 | 35.3 | 22.99 |
| 36 | 27.201 | 3.44 | 1 | | 22.45 |
| 37 | 775.668 | 1.50 | 1.88300 | 40.8 | 22.89 |
| 38 | 20.246 | 6.56 | 1.85478 | 24.8 | 23.92 |
| 39 | −107.871 | 1.50 | 1.88300 | 40.8 | 24.35 |
| 40 | 113.856 | 0.20 | 1 | | 24.98 |
| 41 | 29.221 | 6.75 | 1.85478 | 24.8 | 26.76 |
| 42 | 60.858 | 1.50 | 1.88300 | 40.8 | 25.92 |
| 43 | 33.922 | 19.54 | 1 | | 25.47 |
| 44 | 39.993 | 12.31 | 1.53172 | 48.8 | 34.04 |
| 45 | −34.383 | 1.50 | 1.95906 | 17.5 | 33.72 |
| 46 | −170.719 | | 1 | | 34.66 |
| Image plane | ∞ | | | | |

Aspherical surface data

Eleventh surface

K = 0.00000e+000  A4 = 1.34967e−006  A6 = −4.59445e−010
A6 = 5.39719e−014  A10 = 1.48200e−016  A12 = −4.446736e−020

Eighteenth surface

K = 0.00000e+000  A4 = 1.03240e−006  A6 = −5.48948e−011
A8 = −7.61369e−014  A10 = 2.71026e−016  A12 = −1.43650e−019

Twenty-third surface

K = 0.00000e+000  A4 = −1.39189e−006  A6 = −2.09025e−010
A8 = −7.86430e−013  A10 = 1.16795e−015  A12 = −9.06787e−019

Twenty-seventh surface

K = 0.00000e+000  A4 = −2.01409e−006  A6 = 5.39440e−010
A8 = 9.28833e−013  A10 = −2.69874e−015  A12 = 1.98395e−018

Various data
Zoom ratio 11.00

| | Wide angle | Intermediate | Telephoto |
|---|---|---|---|
| Focal length | 50.00 | 166.00 | 550.09 |
| F-number | 4.00 | 4.00 | 4.00 |
| Angle of field | 23.41 | 7.43 | 2.25 |
| Image height | 21.65 | 21.65 | 21.65 |
| Total lens length | 449.62 | 449.62 | 449.62 |
| BF | 49.91 | 49.91 | 49.91 |
| d10 | 16.97 | 97.72 | 149.35 |
| d18 | 139.31 | 57.30 | 6.46 |
| d24 | 15.43 | 9.34 | 12.76 |
| d29 | 2.00 | 9.35 | 5.14 |
| Entrance pupil position | 154.03 | 508.75 | 1723.06 |
| Exit pupil position | −52.31 | −52.31 | −52.31 |
| Front principal point position | 179.58 | 405.18 | −687.13 |
| Rear principal point position | −0.09 | −116.09 | −500.18 |

Zoom lens Unit data

| Unit | First surface | Focal length | Lens structure length | Front principal point position | Rear principal point position |
|---|---|---|---|---|---|
| 1 | 1 | 230.00 | 84.05 | 43.02 | −17.19 |
| 2 | 11 | −42.42 | 33.30 | 4.60 | −24.61 |
| 3 | 19 | 100.00 | 17.43 | 6.78 | −5.07 |
| 4 | 25 | 75.00 | 23.34 | 3.28 | −12.58 |
| 5 | 30 | −51.64 | 67.88 | 1.99 | −50.39 |

Numerical Embodiment 4

Surface data

| Surface number | r | d | nd | vd | Effective diameter |
|---|---|---|---|---|---|
| 1 | 323.793 | 16.54 | 1.43387 | 95.1 | 142.87 |
| 2 | −461.112 | 0.20 | 1 | | 142.45 |
| 3 | −897.246 | 4.50 | 1.72916 | 54.7 | 141.46 |
| 4 | 150.093 | 0.92 | 1 | | 138.42 |
| 5 | 149.042 | 23.55 | 1.43387 | 95.1 | 139.19 |
| 6 | −746.449 | 0.20 | 1 | | 139.36 |
| 7 | 170.564 | 16.32 | 1.43387 | 95.1 | 139.35 |
| 8 | 2093.602 | 0.20 | 1 | | 138.66 |
| 9 | 140.468 | 14.48 | 1.43387 | 95.1 | 133.05 |
| 10 | 466.164 | (Variable) | 1 | | 131.70 |
| 11* | 248.924 | 1.50 | 1.53715 | 74.8 | 35.97 |
| 12 | 30.699 | 10.17 | 1 | | 31.49 |
| 13 | −34.307 | 1.50 | 1.53715 | 74.8 | 29.39 |
| 14 | 73.732 | 7.15 | 1 | | 28.62 |
| 15 | −29.328 | 1.50 | 1.53715 | 74.8 | 28.67 |
| 16 | 2107.239 | 0.31 | 1 | | 30.76 |
| 17 | 91.584 | 5.58 | 1.65412 | 39.7 | 32.35 |
| 18* | −48.495 | (Variable) | 1 | | 32.96 |
| 19 | 201.356 | 6.03 | 1.51742 | 52.4 | 40.56 |
| 20 | −70.340 | 0.20 | 1 | | 40.68 |
| 21 | −73.507 | 1.50 | 1.90200 | 25.1 | 40.61 |
| 22 | 1122.574 | 0.20 | 1 | | 41.32 |
| 23* | 80.205 | 7.48 | 1.51742 | 52.4 | 42.15 |
| 24 | −75.285 | (Variable) | 1 | | 42.32 |
| 25 | 46.671 | 9.09 | 1.53715 | 74.8 | 39.63 |
| 26 | −74.476 | 0.20 | 1 | | 38.93 |
| 27* | −143.645 | 1.50 | 1.77250 | 49.6 | 37.70 |
| 28 | 39.768 | 7.92 | 1.53715 | 74.8 | 35.49 |
| 29 | −91.081 | (Variable) | 1 | | 35.07 |
| 30 (Stop) | ∞ | 2.50 | 1 | | 28.26 |
| 31 | 34080.822 | 1.50 | 1.88300 | 40.8 | 26.53 |
| 32 | 28.636 | 7.28 | 1.59270 | 35.3 | 24.99 |
| 33 | −56.012 | 0.20 | 1 | | 24.24 |
| 34 | −431.425 | 1.50 | 1.88300 | 40.8 | 23.26 |
| 35 | 25.163 | 4.01 | 1.59270 | 35.3 | 21.87 |
| 36 | 151.721 | 11.70 | 1 | | 21.45 |
| 37 | 317.930 | 1.50 | 1.88300 | 40.8 | 19.03 |
| 38 | 21.630 | 5.15 | 1.85478 | 24.8 | 19.07 |
| 39 | −41.130 | 1.50 | 1.88300 | 40.8 | 19.12 |
| 40 | 58.737 | 0.20 | 1 | | 19.23 |
| 41 | 43.001 | 4.03 | 1.85478 | 24.8 | 19.42 |
| 42 | −42.770 | 1.50 | 1.88300 | 40.8 | 19.37 |
| 43 | 67.007 | 18.60 | 1 | | 19.31 |
| 44 | 168.174 | 4.11 | 1.53172 | 48.8 | 23.44 |
| 45 | −37.776 | 1.50 | 1.95906 | 17.5 | 23.62 |
| 46 | 654.970 | 0.20 | 1 | | 24.39 |
| 47 | 62.647 | 5.66 | 1.53172 | 48.8 | 25.03 |
| 48 | −32.484 | 1.50 | 1.95906 | 17.5 | 25.32 |
| 49 | −48.204 | | 1 | | 26.02 |
| Image plane | ∞ | | | | |

Aspherical surface data

Eleventh surface

K = 0.00000e+000  A4 = 3.65195e−006  A6 = 1.68193e−009
A8 = 4.43501e−012  A10 = −2.24894e−015  A12 = 2.22720e−017

Eighteenth surface

K = 0.00000e+000  A4 = 3.04324e−006  A6 = 3.13823e−009
A8 = 1.50868e−012  A10 = 1.41400e−015  A12 = −2.07204e−018

Twenty-third surface

K = 00000e+000  A4 = −1.90927e−006  A6 = −2.34953e−010
A8 = 4.58990e−013  A10 = −1.10603e−015  A12 = 7.48446e−019

Twenty-seventh surface

K = 0.00000e+000  A4 = −1.91675e−006  A6 = 2.70442e−010
A8 = 1.96888e−012  A10 = −6.13215e−015  A12 = 5.82002e−018

Various data
Zoom ratio 20.00

| | Wide angle | Intermediate | Telephoto |
|---|---|---|---|
| Focal length | 40.00 | 180.00 | 800.05 |
| F-number | 4.60 | 5.30 | 5.60 |
| Angle of field | 20.30 | 4.70 | 1.06 |
| Image height | 14.80 | 14.80 | 14.80 |
| Total lens length | 458.25 | 458.25 | 458.25 |
| BF | 55.08 | 55.08 | 55.08 |
| d10 | 18.61 | 105.27 | 152.20 |
| d18 | 142.85 | 52.38 | 5.93 |
| d24 | 26.83 | 16.54 | 18.08 |
| d29 | 1.99 | 16.09 | 14.07 |
| Entrance pupil position | 134.59 | 575.50 | 2678.02 |
| Exit pupil position | −72.59 | −72.59 | −72.59 |
| Front principal point position | 162.05 | 501.72 | −1535.51 |
| Rear principal point position | 15.08 | −124.92 | −744.97 |

Zoom lens unit data

| Unit | First surface | Focal length | Lens structure length | Front principal point position | Rear principal point position |
|---|---|---|---|---|---|
| 1 | 1 | 218.00 | 76.91 | 33.53 | −20.70 |
| 2 | 11 | −29.00 | 27.71 | 3.66 | −22.45 |
| 3 | 19 | 100.00 | 15.41 | 7.67 | −2.59 |
| 4 | 25 | 77.00 | 18.72 | 3.15 | −9.49 |
| 5 | 30 | −62.59 | 74.13 | −1.66 | −74.29 |

Numerical Embodiment 5

Surface data

| Surface number | r | d | nd | vd | Effective diameter |
|---|---|---|---|---|---|
| 1 | 338.492 | 13.36 | 1.43387 | 95.1 | 145.09 |
| 2 | −1056.352 | 0.20 | 1 | | 144.58 |
| 3 | 9766.859 | 4.50 | 1.72916 | 54.7 | 143.68 |
| 4 | 152.001 | 0.28 | 1 | | 139.81 |
| 5 | 150.359 | 22.32 | 1.43387 | 95.1 | 140.08 |
| 6 | −1220.081 | 0.20 | 1 | | 140.04 |
| 7 | 162.878 | 16.33 | 1.43387 | 95.1 | 138.78 |
| 8 | 1342.727 | 0.20 | 1 | | 138.01 |
| 9 | 146.736 | 13.34 | 1.43387 | 95.1 | 132.70 |
| 10 | 440.765 | (Variable) | 1 | | 131.37 |
| 11* | 540.975 | 1.50 | 1.53715 | 74.8 | 55.04 |
| 12 | 31.782 | 12.98 | 1 | | 43.73 |
| 13 | −60.783 | 1.50 | 1.49700 | 81.5 | 43.44 |
| 14 | 69.516 | 10.72 | 1 | | 40.42 |
| 15 | −31.884 | 1.50 | 1.49700 | 81.5 | 40.29 |
| 16 | −235.525 | 0.20 | 1 | | 43.17 |
| 17 | 86.044 | 6.51 | 1.65412 | 39.7 | 45.15 |
| 18* | −94.646 | (Variable) | 1 | | 45.23 |
| 19 | −252.124 | 4.63 | 1.49700 | 81.5 | 41.72 |
| 20 | −64.746 | 0.20 | 1 | | 42.09 |
| 21 | −68.342 | 1.50 | 1.80000 | 29.8 | 42.06 |
| 22 | −147.364 | 0.20 | 1 | | 42.88 |
| 23* | 103.732 | 7.01 | 1.49700 | 81.5 | 43.69 |
| 24 | −80.576 | (Variable) | 1 | | 43.77 |
| 25 | 48.169 | 10.36 | 1.43875 | 94.9 | 39.51 |
| 26 | −72.455 | 0.20 | 1 | | 38.41 |
| 27* | −216.225 | 1.50 | 1.77250 | 49.6 | 37.04 |
| 28 | 55.197 | 8.32 | 1.49700 | 81.5 | 35.50 |
| 29 | −84.294 | (Variable) | 1 | | 34.73 |
| 30 (Stop) | ∞ | 2.50 | 1 | | 26.77 |
| 31 | 994.325 | 1.50 | 1.88300 | 40.8 | 25.01 |
| 32 | 30.855 | 5.29 | 1.59270 | 35.3 | 23.65 |
| 33 | −76.667 | 3.38 | 1 | | 23.08 |
| 34 | 658.519 | 1.50 | 1.88300 | 40.8 | 20.20 |
| 35 | 29.537 | 2.46 | 1.59270 | 35.3 | 19.13 |
| 36 | 49.517 | (Variable) | 1 | | 18.61 |
| 37 | −2522.380 | 1.50 | 1.88300 | 40.8 | 24.36 |
| 38 | 21.246 | 8.22 | 1.80000 | 29.8 | 25.19 |
| 39 | −39.806 | 1.50 | 1.81600 | 46.6 | 25.64 |
| 40 | 42.560 | 0.30 | 1 | | 26.97 |
| 41 | 39.767 | 8.32 | 1.80000 | 29.8 | 27.71 |
| 42 | −26.870 | 1.50 | 1.81600 | 46.6 | 28.08 |
| 43 | 413.934 | (Variable) | 1 | | 29.23 |
| 44 | −479.321 | 4.06 | 1.53172 | 48.8 | 29.83 |
| 45 | −47.418 | 1.50 | 1.95906 | 17.5 | 30.37 |
| 46 | −317.270 | 0.20 | 1 | | 31.74 |
| 47 | 85.998 | 7.74 | 1.53172 | 48.8 | 33.24 |
| 48 | −35.508 | 1.50 | 1.95906 | 17.5 | 33.74 |
| 49 | −48.932 | | 1 | | 34.87 |
| Image plane | ∞ | | | | |

Aspherical surface data

Eleventh surface

K = 0.00000e+000  A4 = 2.19810e−006  A6 = −2.03032e−010
A8 = 1.21450e−013  A10 = −2.76399e−016  A12 = 7.660668e−019

Eighteenth surface

K = 0.00000e+000  A4 = 2.49248e−006  A6 = 9.08308e−010
A8 = −2.33699e−013  A10 = −1.57605e−016  A12 = 3.40961e−019

Twenty-third surface

K = 0.00000e+000  A4 = −1.45934e−006  A6 = −1.88905e−010
A8 = 3.64285e−013  A10 = −7.88409e−016  A12 = 5.55245e−019

Twenty-seventh surface

K = 0.00000e+000  A4 = −1.75300e−006  A6 = −1.43359e−011
A8 = 1.63304e−012  A10 = −5.29419e−015  A12 = 5.33797e−018

Various data
Zoom ratio 20.00

| | Wide angle | Intermediate | Telephoto |
|---|---|---|---|
| Focal length | 40.00 | 180.00 | 800.08 |
| F-number | 4.60 | 5.26 | 5.60 |
| Angle of field | 28.42 | 6.86 | 1.55 |
| Image height | 21.65 | 21.65 | 21.65 |
| Total lens length | 455.67 | 455.67 | 455.67 |
| BF | 55.00 | 55.00 | 55.00 |
| d10 | 2.00 | 98.12 | 151.95 |
| d18 | 148.92 | 49.05 | 1.50 |
| d24 | 31.95 | 20.89 | 21.44 |
| d29 | 2.00 | 16.81 | 9.98 |
| d36 | 5.21 | 6.91 | 22.28 |
| d43 | 18.07 | 16.37 | 1.00 |
| Entrance pupil position | 105.80 | 523.39 | 2601.65 |
| Exit pupil position | −88.14 | −87.24 | −76.78 |
| Front principal point position | 134.62 | 475.60 | −1455.66 |
| Rear principal point position | 15.00 | −125.00 | −745.08 |

Zoom lens unit data

| Unit | First surface | Focal length | Lens structure length | Front principal point position | Rear principal point position |
|---|---|---|---|---|---|
| 1 | 1 | 223.00 | 70.72 | 27.97 | −21.67 |
| 2 | 11 | −32.70 | 34.91 | 4.59 | −27.63 |
| 3 | 19 | 96.00 | 13.55 | 8.00 | −0.96 |
| 4 | 25 | 83.00 | 20.38 | 4.82 | −9.65 |
| 5 | 30 | −45.70 | 16.62 | 10.01 | −1.97 |
| 6 | 37 | −166.63 | 21.34 | 3.54 | −8.20 |
| 7 | 44 | 145.17 | 14.99 | 13.10 | 4.00 |

Numerical Embodiment 6

| Surface data | | | | | |
|---|---|---|---|---|---|
| Surface number | r | d | nd | vd | Effective diameter |
| 1 | 525.150 | 17.98 | 1.43387 | 95.1 | 165.29 |
| 2 | −386.921 | 0.20 | 1 | | 164.23 |
| 3 | −397.936 | 4.00 | 1.77250 | 49.6 | 163.82 |
| 4 | 256.224 | 4.16 | 1 | | 157.89 |
| 5 | 259.750 | 21.27 | 1.43387 | 95.1 | 158.20 |
| 6 | −531.172 | 11.90 | 1 | | 157.77 |
| 7 | 281.361 | 16.54 | 1.43387 | 95.1 | 153.18 |
| 8 | −1012.161 | 0.20 | 1 | | 151.94 |
| 9 | 218.874 | 14.41 | 1.43387 | 95.1 | 143.52 |
| 10 | 3797.221 | 0.20 | 1 | | 142.44 |
| 11 | 150.278 | 12.22 | 1.43387 | 95.1 | 134.60 |
| 12 | 340.920 | (Variable) | 1 | | 132.75 |
| 13* | 6640.105 | 1.20 | 1.77250 | 49.6 | 53.41 |
| 14 | 42.436 | 13.30 | 1 | | 45.44 |
| 15 | −44.708 | 1.20 | 1.53715 | 74.8 | 44.51 |
| 16 | 59.902 | 0.90 | 1 | | 42.67 |
| 17 | 64.837 | 10.02 | 1.65412 | 39.7 | 42.76 |
| 18 | −52.018 | 2.92 | 1 | | 42.41 |
| 19 | −34.694 | 1.20 | 1.53715 | 74.8 | 41.99 |
| 20 | 165.769 | 0.44 | 1 | | 42.12 |
| 21 | 201.063 | 3.80 | 1.72047 | 34.7 | 42.15 |
| 22 | −248.245 | (Variable) | 1 | | 42.16 |
| 23 | −93.960 | 1.20 | 1.59522 | 67.7 | 38.75 |
| 24 | 250.155 | 2.91 | 1.90200 | 25.1 | 39.87 |
| 25 | −337.935 | 1.66 | 1 | | 40.18 |
| 26 | −99.190 | 1.20 | 1.72916 | 54.7 | 40.24 |
| 27 | −1412.961 | (Variable) | 1 | | 41.29 |
| 28 | 696.983 | 5.92 | 1.43875 | 94.9 | 43.21 |
| 29 | −60.816 | 0.20 | 1 | | 43.77 |
| 30* | 107.225 | 3.82 | 1.60311 | 60.6 | 45.07 |
| 31 | 329.310 | 0.20 | 1 | | 45.10 |
| 32 | 238.219 | 1.20 | 1.83400 | 37.2 | 45.14 |
| 33 | 178.775 | 3.43 | 1.49700 | 81.5 | 45.09 |
| 34 | −503.903 | 0.99 | 1 | | 45.11 |
| 35 (Stop) | ∞ | 1.00 | 1 | | 45.08 |
| 36* | 46.927 | 8.68 | 1.60311 | 60.6 | 44.93 |
| 37 | 1082.680 | 12.96 | 1 | | 43.62 |
| 38 | 103.828 | 1.30 | 1.84666 | 23.8 | 33.71 |
| 39 | 27.869 | 5.03 | 1.48749 | 70.2 | 31.24 |
| 40 | 45.526 | 4.70 | 1 | | 30.27 |
| 41 | 25.942 | 8.32 | 1.49700 | 81.5 | 29.16 |
| 42 | −49.356 | 1.30 | 1.88300 | 40.8 | 28.20 |
| 43 | 24.054 | 6.64 | 1.64769 | 33.8 | 26.16 |
| 44 | −67.743 | 11.46 | 1 | | 25.94 |
| 45* | 109.724 | 1.20 | 1.88300 | 40.8 | 23.59 |
| 46 | 18.867 | 0.33 | 1 | | 22.48 |
| 47 | 19.373 | 11.85 | 1.69895 | 30.1 | 22.86 |
| 48 | −13.841 | 1.20 | 1.83481 | 42.7 | 22.54 |
| 49 | 79.551 | 0.20 | 1 | | 23.18 |
| 50 | 79.565 | 6.26 | 1.69895 | 30.1 | 23.26 |
| 51 | −30.370 | 1.20 | 1.88300 | 40.8 | 23.60 |
| 52 | 89.347 | 21.16 | 1 | | 24.39 |
| 53 | 58.746 | 11.06 | 1.62041 | 60.3 | 39.11 |
| 54 | −35.731 | 1.20 | 1.84666 | 23.8 | 39.25 |
| 55 | −96.770 | | 1 | | 40.36 |
| Image plane | ∞ | | | | |

Aspherical surface data

Thirteenth surface

K = 8.73228e+003　　A4 = 1.93552e−006　　A6 = 7.30278e−010　　A8 = −4.11416e−012
A10 = 1.02033e−014　　A12 = −2.67404e−018　　A14 = −1.44507e−020　　A16 = 1.36217e−023

Thirtieth surface

K = 2.34161e−001　　A4 = −1.14955e−006　　A6 = 7.61543e−011
A8 = −5.72777e−013　　A10 = 4.16304e−016　　A12 = −2.76724e−019

Thirty-sixth surface

K = 2.58361e−001　　A4 = 2.47940e−007　　A6 = −3.26879e−011
A8 = 4.4347e−013　　A10 = −2.51381e−016　　A12 = 2.00540e−019

-continued

| Forty-fifth surface | | |
|---|---|---|
| K5 = 5.93347e+001 | A4 = 8.01108e−007 | A6 = −1.44279e−009 |
| A8 = 3.36608e−011 | A10 = −2.05140e−013 | A12 = 5.44834e−016 |

Various data
Zoom ratio 20.00

| | Wide angle | Intermediate | Telephoto |
|---|---|---|---|
| Focal length | 40.00 | 180.00 | 800.00 |
| F-number | 4.60 | 4.60 | 5.60 |
| Angle of field | 28.42 | 6.86 | 1.55 |
| Image height | 21.65 | 21.65 | 21.65 |
| Total lens length | 473.71 | 473.71 | 473.71 |
| BF | 51.98 | 51.98 | 51.98 |
| d12 | 0.99 | 97.17 | 136.44 |
| d22 | 140.10 | 27.10 | 6.47 |
| d27 | 2.81 | 19.64 | 1.00 |
| Entrance pupil position | 124.91 | 552.50 | 1711.87 |
| Exit pupil position | −123.45 | −123.45 | −123.45 |
| Front principal point position | 155.79 | 547.81 | −1136.25 |
| Rear principal point position | 11.98 | −128.02 | −748.02 |

Zoom lens unit data

| Unit | First surface | Focal length | Lensstructure length | Front principal point position | Rear principal point position |
|---|---|---|---|---|---|
| 1 | 1 | 196.00 | 103.08 | 60.03 | −14.99 |
| 2 | 13 | −32.60 | 34.98 | 5.21 | −21.42 |
| 3 | 23 | −107.00 | 6.97 | 2.09 | −2.49 |
| 4 | 28 | 52.13 | 132.80 | −3.16 | −134.91 |

TABLE 1

Values corresponding to the conditional expressions in Numerical Embodiments 1 to 6

| Conditional expression number | Conditional Expression | Numerical Embodiment | | | | | |
|---|---|---|---|---|---|---|---|
| | | 1 | 2 | 3 | 4 | 5 | 6 |
| | fW | 40.00 | 50.00 | 50.00 | 40.00 | 40.00 | 40.00 |
| | fT | 800.01 | 1,500.08 | 550.09 | 800.05 | 800.08 | 800.00 |
| | f1 | 220.00 | 215.00 | 230.00 | 218.00 | 223.00 | 196.00 |
| | f2 | −33.00 | −30.50 | −42.42 | −29.00 | −32.70 | −32.60 |
| | ω_W | 28.42 | 23.41 | 23.41 | 20.30 | 28.42 | 28.42 |
| | β 2w | −0.20 | −0.22 | −0.29 | −0.20 | −0.20 | −0.23 |
| | β 2T | −2.92 | −3.63 | −2.58 | −2.33 | −2.71 | −4.82 |
| | L2W | 150.89 | 166.85 | 139.31 | 142.85 | 148.92 | 140.10 |
| | LF | 325.95 | 357.40 | 331.82 | 329.03 | 324.43 | 304.69 |
| (1) | f1/f2 | −6.67 | −7.05 | −5.42 | −7.52 | −6.82 | −6.01 |
| (2) | f2/(2 × fW × tan(ω_W)) | −0.76 | −0.70 | −0.98 | −0.98 | −0.76 | −0.75 |
| (3) | β 2T/β 2W | 14.25 | 16.81 | 9.05 | 11.74 | 13.41 | 21.04 |
| (4) | fT/f1 | 3.64 | 6.98 | 2.39 | 3.67 | 3.59 | 4.08 |
| (5) | f2/L2W | −0.22 | −0.18 | −0.30 | −0.20 | −0.22 | −0.23 |
| (6) | LF/(2 × fW × tan(ω_W)) | 7.53 | 8.26 | 7.66 | 11.12 | 7.49 | 7.04 |
| (7) | fT/(2 × fW × tan(ω_W)) | 18.48 | 34.65 | 12.71 | 27.04 | 18.48 | 18.48 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-094611, filed May 1, 2014, which is hereby incorporated by reference herein in its entirety.

What is claimed is:

1. A zoom lens comprising in order from an object side to an image side:
a first lens unit having a positive refractive power and configured not to move for zooming;
a second lens unit having a negative refractive power and configured to move for zooming;
at least one lens unit configured to move for zooming; and
a rear lens unit including an aperture stop,
wherein an interval of each pair of adjacent lens units of the first lens unit, the second lens unit, the at least one lens unit and the rear lens unit is changed for zooming, and
wherein the zoom lens satisfies expressions $-12.00 < f1/f2 < -4.00;$ $-0.99 \leq f2/(2 \times fW \times \tan(\omega\_W)) < -0.30;$ and $-0.05 < f2/L2W < -0.05,$ where fW represents a focal length of the zoom lens at a wide angle end, f1 represents a focal length of the first lens unit, f2 represents a focal length of the second lens unit, ω_W represents a half angle of field of the zoom lens al the wide angle end, and L2W represents an interval on an optical axis between a surface, closest to the image side, of the second lens unit and a surface, closest to the object side, of the at least one lens unit at the wide angle end.

2. A zoom lens according to claim 1, wherein the zoom lens satisfies an expression $$9.00<\beta 2T/\beta 2W<35.00,$$

where β2W represents a lateral magnification of the second lens unit at the wide angle end and at infinity in an object distance, and β2T represents a lateral magnification of the second lens unit at a telephoto end and at infinity in the object distance.

3. A zoom lens according to claim 1, wherein the zoom lens satisfies an expression $$4.00<LF/(2\times fW\times\tan(\omega\_W))<20.00,$$

where LF represents a distance on an optical axis from a surface, closest to the object side, of the first lens unit to the aperture stop.

4. A zoom lens according to claim 1, wherein the zoom lens satisfies an expression $$10.00<fT/(2\times fW\times\tan(\omega\_W))<40.00,$$

where fT represents a focal length of the zoom lens at a telephoto end.

5. A zoom lens according to claim 1, wherein the aperture stop does not move for zooming.

6. An image pickup apparatus, comprising:
a zoom lens comprising, in order from an object side to an image side:
  a first lens unit having a positive refractive power and configured not to move for zooming;
  a second lens unit having a negative refractive power and configured to move for zooming;
  at least one lens unit configured to move for zooming; and
  a rear lens unit including an aperture stop,
  wherein an interval of each pair of adjacent lens units of the first lens unit, the second lens unit, the at least one lens unit and the rear lens unit is changed for zooming, and
  wherein the zoom lens satisfies expressions $$-12.00<f1/f2<-4.00;$$

$$-0.99<f2/(2\times fW\times\tan(\omega\_W))<-0.30;\text{ and}$$

$$-0.50<f2/L2W<-0.05,$$

where fW represents a focal length of the zoom lens at a wide angle end, f1 represents a focal length of the first lens unit, f2 represents a focal length of the second lens unit, ω_W represents a half angle of field of the zoom lens at the wide angle end, and L2W represents an interval on an optical axis between a surface, closest to the image side, of the second lens unit and a surface, closest to the object side, of the at least one lens unit at the wide angle end; and
an image pickup element configured to receive an image formed by the zoom lens.

7. A zoom lens according to claim 1, wherein the zoom lens performs focusing with a lens unit which is disposed on an object side of the aperture stop.

8. A zoom lens according to claim 1, wherein the zoom lens satisfies an expression $$2.00<fT/f1<8.00,$$

where fT represents a focal length of the zoom lens at a telephoto end.

9. A zoom lens according to claim 1, wherein the zoom lens satisfies an expression $$2.39\leq fT/f1<8.00,$$

where fT represents a focal length of the zoom lens at a telephoto end.

10. A zoom lens according to claim 1, wherein the zoom lens satisfies an expression $$3.59\leq fT/f1<8.00,$$

where fT represents a focal length of the zoom lens at a telephoto end.

11. A zoom lens according to claim 1, wherein the zoom lens satisfies an expression $$-12.00<f1/f2<-5.00.$$

12. A zoom lens comprising in order from an object side to an image side:
  a first lens unit having a positive refractive power and configured not to move for zooming;
  a second lens unit having a negative refractive power and configured to move for zooming;
  at least one lens unit configured to move for zooming; and
  a rear lens unit including an aperture stop,
  wherein an interval of each pair of adjacent lens units of the first lens unit, the second lens unit, the at least one lens unit and the rear lens unit is changed for zooming, and
  wherein the zoom lens satisfies expressions $$-12.00<f1/f2<-5.00;$$

$$-1.00<f2/(2\times fW\times\tan(\omega\_W))<-0.30;\text{ and}$$

$$-0.50<f2/L2W<-0.05,$$

where fW represents a focal length of the zoom lens at a wide angle end, f1 represents a focal length of the first lens unit, f2 represents a focal length of the second lens unit, ω_W represents a half angle of field of the zoom lens at the wide angle end, and L2W represents an interval on art optical axis between a surface, closest to the image side, of the second lens unit and a surface, closest to the object side, of the at least one lens unit at the wide angle end.

13. A zoom lens according to claim 12, wherein the zoom lens satisfies an expression $$9.00<\beta 2T/\beta 2W<35.00,$$

where β2W represents a lateral magnification of the second lens unit at the wide angle end and at infinity in an object distance, and β2T represents a lateral magnification of the second lens unit at a telephoto end and at infinity in the object distance.

14. A zoom lens according to claim 12, wherein the zoom lens satisfies an expression $$4.00<LF/(2\times fW\times\tan(\omega\_W))<20.00,$$

where LF represents a distance on an optical axis from a surface, closest to the object side, of the first lens unit to the aperture stop.

15. A zoom lens according to claim 12, wherein the zoom lens satisfies an expression $$10.00<fT/(2\times fW\times\tan(\omega\_W))<40.00$$

where fT represents a focal length of the zoom lens at a telephoto end.

16. A zoom lens according to claim 12, wherein the aperture stop does not move for zooming.

17. An image pickup apparatus comprising:
a zoom lens defined in claim 12; and
an image pickup element configured to receive an image formed by the zoom lens.

18. A zoom lens according to claim 12, wherein the zoom lens performs focusing with a lens unit which is disposed on art object side of the aperture stop.

19. A zoom lens according to claim 12, wherein the zoom lens satisfies an expression $$2.00 < fT/f1 < 8.00,$$

where fT represents a focal length of the zoom lens at a telephoto end.

* * * * *